US012753082B2

(12) United States Patent
Novek

(10) Patent No.: US 12,753,082 B2
(45) Date of Patent: Oct. 6, 2026

(54) PROCESSES FOR PRODUCING ALKALI HYDROXIDES OR ALKALI SULFITES USING LARGE MOLECULAR WEIGHT ACID INTERMEDIATES

(71) Applicant: INNOVATOR ENERGY LLC, Houston, TX (US)

(72) Inventor: Ethan Novek, Houston, TX (US)

(73) Assignee: INNOVATOR ENERGY LLC, Houston, TX (US)

( * ) Notice: Subject to any disclaimer, the term of this patent is extended or adjusted under 35 U.S.C. 154(b) by 0 days.

(21) Appl. No.: 19/458,322

(22) Filed: Jan. 23, 2026

(65) Prior Publication Data

US 2026/0152406 A1 Jun. 4, 2026

Related U.S. Application Data

(63) Continuation-in-part of application No. 19/249,326, filed on Jun. 25, 2025.

(60) Provisional application No. 63/829,432, filed on Jun. 24, 2025, provisional application No. 63/800,539, filed on May 6, 2025, provisional application No. 63/749,177, filed on Jan. 24, 2025, provisional application No. 63/744,532, filed on Jan. 13, 2025,
(Continued)

(51) Int. Cl.
*C01D 1/04* (2006.01)
*C01D 5/14* (2006.01)
*C01D 7/00* (2006.01)

(52) U.S. Cl.
CPC ................. *C01D 1/04* (2013.01); *C01D 7/00* (2013.01); *C01D 5/14* (2013.01)

(58) Field of Classification Search
CPC .... C01D 1/04; C01D 7/00; C01D 5/14; C07C 51/02; C01F 11/02
See application file for complete search history.

(56) References Cited

U.S. PATENT DOCUMENTS

2008/0138265 A1 6/2008 Lackner et al.
2008/0233029 A1 9/2008 Fan et al.
(Continued)

FOREIGN PATENT DOCUMENTS

WO 2023225089 A1 11/2023

OTHER PUBLICATIONS

Notification of Transmittal of the International Search Report and the Written Opinion of the International Searching Authority issued in PCT/US2025/035178, mailed Sep. 17, 2025, 9 pages.
(Continued)

*Primary Examiner* — Anthony J Zimmer
*Assistant Examiner* — Syed T Iqbal
(74) *Attorney, Agent, or Firm* — HUNTON ANDREWS KURTH LLP

(57) ABSTRACT

The application pertains to processes for producing alkali hydroxides or alkali sulfites using large molecular weight acid intermediates. Generally, a component comprising an alkaline-earth cation—small molecular weight acid anion may be reacted with a component comprising an alkali sulfate to form a component comprising an alkali cation—small molecular weight acid anion and a component comprising an alkaline-earth sulfate. A series of additional steps results in forming a component comprising an alkali hydroxide, or an alkali carbonate, or an alkali bicarbonate, or any combination thereof.

21 Claims, 4 Drawing Sheets

Related U.S. Application Data provisional application No. 63/687,345, filed on Aug. 27, 2024, provisional application No. 63/670,323, filed on Jul. 12, 2024, provisional application No. 63/668,123, filed on Jul. 5, 2024, provisional application No. 63/667,259, filed on Jul. 3, 2024, provisional application No. 63/663,995, filed on Jun. 25, 2024.

(56) References Cited

U.S. PATENT DOCUMENTS

| | | | | |
|---|---|---|---|---|
| 2019/0177194 | A1 | 6/2019 | Sceats et al. | |
| 2022/0274907 | A1 * | 9/2022 | Novek | C01F 11/06 |
| 2023/0304166 | A1 | 9/2023 | Zenyuk et al. | |
| 2023/0382841 | A1 | 11/2023 | Novek | |
| 2023/0391707 | A1 | 12/2023 | Novek | |

OTHER PUBLICATIONS

Notification of Transmittal of the International Search Report and the Written Opinion of the International Searching Authority issued in PCT/US2026/012401, mailed Apr. 7, 2026, 9 pages.

* cited by examiner

PROCESSES FOR PRODUCING ALKALI HYDROXIDES OR ALKALI SULFITES USING LARGE MOLECULAR WEIGHT ACID INTERMEDIATES

CROSS-REFERENCE TO RELATED APPLICATIONS

For U.S. purposes this application claims priority to U.S. provisional application SN 63/749,177 entitled "NAOH PRODUCTION WITH INTERMEDIATES COMPRISING CITRIC ACID ACETIC ACID" filed Jan. 24, 2025 (121530.0000204) and U.S. provisional application Ser. No. 63/829,432 entitled "Process for Producing Alkali Hydroxides or Alkali Sulfites using Large MW Acid Intermediate" filed Jun. 24, 2025 (121530.0000220), each of which are incorporated by reference. This patent application is a continuation-in-part of U.S. utility application Ser. No. 19/249,326 entitled "PROCESSES FOR PRODUCING ALKALI COMPOUNDS USING ACID GAS" filed Jun. 25, 2025 which application is incorporated herein by reference and claims priority to the following provisional applications, each of which is incorporated herein by reference:

Application Number: 63/663,995; Filing Date: Jun. 25, 2024;

Application No. 63/667,259; Filing Date: Jul. 3, 2024;

Application Number: 63/668,123; Filing Date: Jul. 5, 2024;

Application No. 63/670,323; Filing Date: Jul. 12, 2024;

Application No. 63/687,345; Filing Date: Aug. 27, 2024;

Application No. 63/744,532; Filing Date: Jan. 13, 2025; and

Application No. 63/800,539; Filing Date: May 6, 2025.

For PCT purposes this application claims priority to U.S. provisional application SN 63/749,177 entitled "NAOH PRODUCTION WITH INTERMEDIATES COMPRISING CITRIC ACID ACETIC ACID" filed Jan. 24, 2025 (121530.0000204) and U.S. provisional application Ser. No. 63/829,432 entitled "Process for Producing Alkali Hydroxides or Alkali Sulfites using Large MW Acid Intermediate" filed Jun. 24, 2025 (121530.0000220) and U.S. utility application Ser. No. 19/249,326 entitled "PROCESSES FOR PRODUCING ALKALI COMPOUNDS USING ACID GAS" filed Jun. 25, 2025 and U.S. provisional application Ser. No. 63/800,539 filed May 6, 2025.

This application is also related to the following patents and applications that are incorporated herein by reference for U.S. purposes: PCT/US25/12754 filed Jan. 23, 2025; US2025/0019336; 12,017,985; 11,542,219; 11,512,036; 11,897,840; 11,236,033; 11,034,619; 11,897,840; WO2023/225089; 12,017,985; US2025/0019253; WO2023/220380; 12,030,846; 12,030,847; and 11,174,169.

BACKGROUND AND SUMMARY

The production of alkali hydroxides, such as sodium hydroxide, or potassium hydroxide, or lithium hydroxide, are expensive, energy intensive, and $CO_2$ emitting. Additionally, the production of byproduct or waste sodium sulfate from various industries, including, but not limited to, lithium production, lithium refining, lithium-ion battery recycling, battery recycling, lead acid battery recycling, textile production, neutralization reactions, mining, copper production, copper refining, metal refining, flue gas desulfurization, rare earth processing, cathode material product, manganese refining, nickel refining, cobalt refining, pigment production, silica production, sodium chloride purification, trona processing, or ore processing, to name a few, is a significant and is expected to grow significantly in the coming years.

Some embodiments may pertain to systems and methods for producing alkali hydroxides, or alkali carbonates, or alkali bicarbonates, or alkali salts, or alkali sulfites, or alkali bisulfites, or a derivative thereof, or any combination thereof from, for example, alkali sulfates, alkali chlorides, or water, or carbon dioxide, or sulfur dioxide, or calcium carbonate, or any combination thereof.

DETAILED DESCRIPTION

Figure 1A:
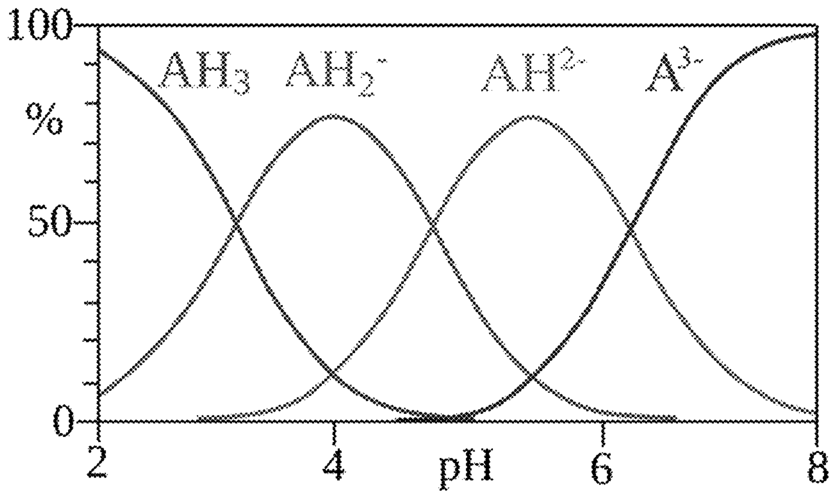
FIG. 1A: Citric Acid speciation vs. pH

Some embodiments may comprise systems and methods for producing a chemical comprising an alkali hydroxide, or alkali carbonate, or alkali bicarbonate, or alkali sesquicarbonate, or a derivative thereof, or any combination thereof from a chemical comprising an alkali sulfate. In some embodiments, a process may comprise inputs comprising a chemical comprising an alkali sulfate, or a chemical comprising an alkaline earth cation-weak acid species anion, or water, or any combination thereof, and/or intermediates comprising a chemical comprising a small molecular weight acid species, or a chemical comprising a large molecular weight acid species, or a chemical comprising sulfur dioxide or sulfurous acid or sulfur, or any combination thereof, and/or outputs comprising a chemical comprising an alkali hydroxide, or alkali carbonate, or alkali bicarbonate, or alkali sesquicarbonate, or a derivative thereof, or an alkaline earth sulfate, or a derivative thereof, or a weak acid derivative, or a derivative thereof, or sulfuric acid, or a derivative thereof, or any combination thereof.

In some embodiments, chemicals may be produced in a manner which achieves low energy consumption, or high energy efficiency, or low cost, or low upfront cost, or low operating cost, or low marginal cost, or high yield, or high recyclability, or high recyclability of intermediates, or low $CO_2$ emissions, or net negative $CO_2$ emissions, or $CO_2$ conversion, or less waste, or circularity, or circular economy, or any combination thereof.

In some embodiments, a chemical comprising a small molecular weight carboxylic acid, or a volatile carboxylic acid, or a carboxylic acid which may have a vapor pressure under low pH conditions, or any combination thereof may be reacted with a chemical comprising an alkaline earth to form a chemical comprising an alkaline earth carboxylate or an alkaline earth+small molecular weight carboxylic acid species. In some embodiments, a chemical comprising an alkali sulfate may be reacted with a chemical comprising an alkaline earth+small molecular weight carboxylate to form a chemical comprising an alkali+small molecular weight carboxylate and a chemical comprising an alkaline earth sulfate. The chemical comprising an alkali+small molecular weight carboxylate may be mixed or reacted with a chemical comprising a large molecular weight carboxylate, or a chemical comprising a non-volatile acid species, or any combination thereof in a manner to form, for example, a chemical comprising an alkali+large molecular weight carboxylate and at least an at least partially separated chemical comprising small molecular weight carboxylate. The chemical comprising an alkali+large molecular weight carboxylate or alkali+nonvolatile acid species may be reacted with a chemical comprising an alkaline earth hydroxide, or alkaline earth oxide, or alkaline earth carbonate, or alkaline earth bicarbonate, or any combination thereof to form a chemical comprising an alkali hydroxide, or alkali carbonate, or alkali bicarbonate, or any combination thereof and/or a chemical comprising an alkaline earth+large molecular weight carboxylate, or a chemical comprising alkaline earth+nonvolatile acid species, or any combination thereof. The chemical comprising an alkaline earth+large molecular weight carboxylate, or a chemical comprising alkaline earth+nonvolatile acid species, or any combination thereof may be reacted with a chemical comprising an acid stronger than the large molecular weight carboxylic acid, or the non-volatile acid species, or any combination thereof, or may be reacted with sulfur dioxide or sulfurous acid or sulfur dioxide derivative, or may be reacted with an acid, or any combination thereof to form an alkaline earth+acid anion of acid stronger than the large molecular weight carboxylic acid, or an alkaline earth sulfite, or an alkaline earth bisulfite, or any combination thereof and a chemical comprising a large molecular weight acid, or a large molecular weight carboxylic acid, or a non-volatile acid, or any combination thereof. The chemical comprising a alkaline earth+acid anion of acid stronger than the large molecular weight carboxylic acid, or an alkaline earth sulfite, or an alkaline earth bisulfite, or any combination thereof may be reacted or decomposed to form a chemical comprising an alkaline earth oxide, or alkaline earth hydroxide, or any combination thereof and/or a chemical comprising a derivative of its anion, such as, for example, a chemical comprising sulfur dioxide, or sulfurous acid, or aqueous sulfur dioxide, or any combination thereof.

In some embodiments, a chemical comprising an alkaline earth cation-weak acid anion may be reacted with a chemical comprising a small molecular weight (MW) acid species to form, for example, a portion of a chemical comprising an alkaline earth cation—small molecular weight (MW) acid species anion and a chemical comprising a weak acid derivative. In some embodiments, a solid comprising an alkaline earth cation-weak acid anion may be reacted with a gas, or liquid, or solution, or any combination thereof chemical comprising a small molecular weight (MW) acid species to form, for example, a portion of a solution comprising an alkaline earth cation—small molecular weight (MW) acid species anion and a gas or solid comprising a weak acid derivative. In some embodiments, a chemical comprising calcium carbonate may be reacted with a chemical comprising a small molecular weight (MW) acid species, such as formic acid, or acetic acid, or propanoic acid, to form a chemical comprising calcium+a small molecular weight acid species anion, such as calcium formate, or calcium acetate, or calcium propanoate, or any combination thereof, and a gas or fluid comprising carbon dioxide. In some embodiments, a chemical comprising calcium sulfide may be reacted with a chemical comprising a small molecular weight (MW) acid species, such as formic acid, or acetic acid, or propanoic acid, to form a chemical comprising calcium+a small molecular weight acid species anion, such as calcium formate, or calcium acetate, or calcium propanoate, or any combination thereof, and a gas or fluid comprising hydrogen sulfide. In some embodiments, for example, the weak acid derivative may comprise a captured material or captured gas.

In some embodiments, a chemical comprising an alkaline earth cation—small molecular weight anion may be reacted with a chemical comprising an alkali sulfate to form a chemical comprising an alkaline earth sulfate and a chemical comprising an alkali cation—small molecular weight acid anion. In some embodiments, a solution comprising an alkaline earth cation—small molecular weight acid anion may be reacted with a solid or solution or any combination thereof comprising an alkali sulfate to form a chemical comprising a solid comprising an alkaline earth sulfate and a chemical comprising a solution comprising an alkali cation—small molecular weight anion. In some embodiments, a solution comprising calcium+small molecular weight acid anion, such as calcium formate, or calcium acetate, or calcium propanoate, or any combination thereof, may be reacted with a solid or solution or any combination thereof comprising an alkali sulfate to form, for example, a solid comprising calcium sulfate and a solution comprising alkali +small MW acid anion, such as alkali formate, or alkali acetate, or alkali propanoate, or any combination thereof.

In some embodiments, a portion of residual calcium may be recovered or removed from solution. For example, in some embodiments, a portion of calcium may be removed by the addition of an amount of sulfur dioxide or sulfurous acid or sulfite or bisulfite or other sulfur dioxide species, which may result in the precipitation of a portion of calcium solid, for example, such as calcium in the form of calcium sulfite. For example, in some embodiments, a portion of calcium may be removed by the addition of an amount of carbonate, or sodium carbonate, or bicarbonate, or other carbon dioxide species, which may result in the precipitation of a portion of calcium solid, for example, such as calcium in the form of calcium carbonate. For example, in some embodiments, a portion of calcium may be removed by the addition of an amount of an acid which forms a less soluble salt with calcium, or the addition of an alkaline earth salt which comprising an anion which forms a less soluble salt with calcium, or any combination thereof, which may result in the precipitation of a portion of calcium. For example, in some embodiments, a portion of calcium and/or any alkaline earth ions, or transition metal ions, or heavy metal ions, or sulfate ions, or sulfite ions, or divalent ions, or multivalent ions, or impurities, or heavy metal impurities, or any combination thereof may be removed by, for example, including, but not limited to, one or more or any combination of the following: nanofiltration, or ion exchange, or membrane based process, or treatment, or any combination thereof.

In some embodiments, a portion of a solid or a precipitate may be separated using systems and/or methods for solid-liquid separation.

In some embodiments, a chemical comprising an alkali cation-acid anion may be reacted to form an intermediate which may be convertible or capable of being converted into a valuable chemical or chemical product. For example, in some embodiments, a chemical comprising an alkali cation-acid anion may be reacted in a manner to form a second chemical, wherein the second chemical may be reacted or otherwise converted into a valuable chemical. For example, in some embodiments, a chemical comprising an alkali cation-acid anion may be reacted to form a chemical intermediate or second chemical which may be capable of being reacted with a chemical comprising an alkaline-earth hydroxide, such as calcium hydroxide, to form an alkali hydroxide. For example, in some embodiments, a chemical comprising sodium acetate may be reacted with a chemical comprising sulfur dioxide in a manner to form a chemical comprising sodium—sulfur dioxide species, and/or the chemical comprising sodium—sulfur dioxide species may be reacted with a chemical comprising calcium hydroxide to form a chemical comprising sodium hydroxide, which may comprise a valuable chemical, and/or a chemical comprising calcium sulfite, which may be capable of being converted into a chemical comprising calcium oxide, or calcium hydroxide, or sulfur dioxide, or any combination thereof which may enable the regeneration of a portion of reagents or intermediates or intermediate reagents. For example, in some embodiments, a chemical comprising sodium acetate may be reacted with a chemical comprising carbon dioxide in a manner to form a chemical comprising sodium—carbon dioxide species, and/or the chemical comprising sodium—carbon dioxide species may be reacted with a chemical comprising calcium hydroxide to form a chemical comprising sodium hydroxide, which may comprise a valuable chemical, and/or a chemical comprising calcium carbonate, which may be capable of being converted into a chemical comprising calcium oxide, or calcium hydroxide, or sulfur dioxide, or any combination thereof and/or may be recycled within the process as a calcium carbonate input, or any combination thereof. For example, in some embodiments, a chemical comprising sodium acetate may be reacted with a chemical comprising carbon dioxide and sulfur dioxide in a manner to form a chemical comprising sodium—carbon dioxide species, or sodium—sulfur dioxide species, or any combination thereof and/or the chemical(s) comprising chemical comprising sodium—carbon dioxide species, or sodium—sulfur dioxide species, or any combination thereof may be reacted with a chemical comprising calcium hydroxide to form a chemical comprising sodium hydroxide, which may comprise a valuable chemical, and/or a chemical comprising calcium carbonate, or calcium sulfite, or a derivative thereof, or any combination thereof, which may be capable of being converted into a chemical comprising calcium oxide, or calcium hydroxide, or sulfur dioxide, or any combination thereof, if desired, and/or may be recycled within the process as a calcium carbonate input, if desired, or any combination thereof. For example, in some embodiments, a chemical comprising sodium acetate may be reacted with a chemical comprising a large molecular weight carboxylic acid, such as citric acid, and/or a chemical comprising carbon dioxide, in a manner to form a chemical comprising sodium citrate, or sodium—carbon dioxide species, or any combination thereof, and/or the chemical comprising sodium citrate, or sodium—carbon dioxide species, or any combination thereof may be reacted with a chemical comprising calcium hydroxide to form, for example, a chemical comprising sodium hydroxide. For example, in some embodiments, a chemical comprising sodium acetate may be reacted with a chemical comprising a large molecular weight carboxylic acid, such as citric acid, and/or a chemical comprising sulfur dioxide, in a manner to form a chemical comprising sodium citrate, or sodium—sulfur dioxide species, or any combination thereof, and/or the chemical comprising sodium citrate, or sodium—sulfur dioxide species, or any combination thereof may be reacted with a chemical comprising calcium hydroxide to form, for example, a chemical comprising sodium hydroxide. For example, in some embodiments, a chemical comprising sodium acetate may be reacted with a chemical comprising a large molecular weight carboxylic acid or acid which forms a low solubility compound in a salt with some alkaline-earths, such as citric acid, and/or a chemical comprising sulfur dioxide, and/or a chemical comprising carbon dioxide, in a manner to form a chemical comprising sodium citrate, or sodium—sulfur dioxide species, or sodium—carbon dioxide species, or any combination thereof, and/or the chemical comprising sodium citrate, or sodium—sulfur dioxide species, or sodium—carbon dioxide species, or any combination thereof may be reacted with a chemical comprising calcium hydroxide to form, for example, a chemical comprising sodium hydroxide.

In some embodiments, a solution comprising an alkali and a small molecular weight acid species may be reacted with or mixed with a chemical comprising a large molecular weight acid species to form a solution comprising alkali+small molecular weight acid species+large molecular weight acid species. In some embodiments, the solution comprising alkali+small molecular weight acid species+large molecular weight acid species may be reacted, or separation, or any combination thereof in a manner to produce, for example, at least a portion of a chemical or solution comprising alkali+large molecular weight acid species and a solution or chemical comprising small molecular weight acid species. In some embodiments, the solution comprising alkali+small molecular weight acid species+large molecular weight acid species may be reacted, or separation, or any combination thereof in a manner to produce, for example, at least a portion of a chemical or solution comprising alkali+large molecular weight acid species, such as an ionic compound with a cation comprising an alkali and an anion comprising a large molecular weight acid species, and a solution or chemical comprising small molecular weight acid species, such as a solution comprising aqueous small molecular weight acid species. In some embodiments, the solution comprising alkali+small molecular weight acid species+large molecular weight acid species may be reacted, or separation, or any combination thereof in a manner to produce, for example, at least a portion of a chemical or solution comprising alkali+large molecular weight acid species, such as a solution comprising a sodium citrate or a solution comprising a sodium citrate+stoichiometric excess citric acid, and a solution or chemical comprising small molecular weight acid species, such as a solution comprising acetic acid or aqueous acetic acid.

In some embodiments, a small molecular weight carboxylic acid, such as acetic acid or formic acid or propanoic acid, may be provided as an example acid chemical which may comprise at least partially ionic species under some conditions, such as a first pH range, and/or may comprise at least partially non-ionic species under some conditions, such as a second pH range. In some embodiments, a small molecular weight carboxylic acid, such as acetic acid or formic acid or propanoic acid, may be provided as an example acid chemical which may comprise a species which is at least partially permeable through a semi-permeable membrane under some conditions, such as a first pH range and/or in the presence of an ion selective membrane, and/or may comprise at least partially rejected species under some conditions, such as a second pH range and/or in the presence of an ion selective membrane. In some embodiments, a small molecular weight carboxylic acid, such as acetic acid or formic acid or propanoic acid, may be provided as an example acid chemical which may comprise a species which is at least partially electrochemically separable under some conditions, such as a first pH range or in the presence of an ion selective membrane, and/or may comprise a species which is at least partially electrochemically uncharged and/or inseparable under some conditions, such as a second pH range or in the presence of an ion selective membrane.

For example, in some embodiments, acetic acid may be provided as an example low molecular weight (MW) acid or small molecular weight (MW) acid, and/or citric acid may be provided as an example large molecular weight (MW) acid, and/or sodium may be provided as an example alkali. For example, in some embodiments, a chemical comprising citric acid may be added to a solution comprising sodium acetate, wherein the presence of or increased concentration of the citric acid or citric acid species may reduce the pH of the solution. In some embodiments, a solution comprising sodium+acetic acid species+citric acid species may be at least partially separated using a semi-permeable membrane, such as a reverse osmosis membrane or a nanofiltration membrane or any combination thereof, wherein, for example, a portion of a chemical comprising acetic acid may permeate the membrane and/or form a permeate comprising aqueous acetic acid, and/or a portion of a species comprising sodium and a portion of a species comprising citric acid species may be retained or rejected by the membrane. In some embodiments, pressure and/or circulation may be applied to the feed solution, which may comprise sodium+acetic acid species+citric acid species, to facilitate the separation and/or formation of a permeate comprising acetic acid. In some embodiments, the separation of a portion of a chemical comprising acetic acid from a portion of a solution comprising sodium species and/or citric acid species may be facilitated or enabled due to the large molecular weight of citric acid, which may enable or facilitate the retention or rejection of the citric acid species by the membrane, and/or the proportionally larger hydration radius of the sodium relative to the acetic acid under sufficiently low pH conditions, and/or the formation of a portion of non-ionic or free acetic acid species, which may possess a proportionally smaller hydration radius and may facility or enable permeation of acetic acid through the membrane and/or may form or form in greater proportion due to sufficiently low solution pH, or any combination thereof. In some embodiments, the retention of a portion of a chemical comprising citric acid may be partially due to the speciation of citric acid vs. pH, wherein a greater proportion of citric acid species may be ionic species compared to the proportion of acetic acid species which may be ionic species in a solution at the same pH, or in the same solution at the same pH, or in the same solution, or any combination thereof. In some embodiments, a separation of a chemical comprising acetic acid from a solution comprising sodium species and/or citric acid species may result in the formation of at least a portion of a solution comprising acetic acid, which may comprise a permeate solution, and/or at least a portion of a solution comprising sodium+citric acid species, such as a sodium citrate, which may comprise a retentate solution. In some embodiments, a portion of the addition of a chemical comprising citric acid may be batch, or semi-batch, or continuous, or any combination thereof. In some embodiments, a portion of the addition of a chemical comprising citric acid may be conducted during the separation, for example, to facilitate or maintain a sufficiently low pH to enable the separation of acetic acid species.

In some embodiments, a chemical comprising a non-volatile acid or acid with a low vapor pressure or acid with a lower vapor pressure than the small molecular weight acid or volatile acid or any combination thereof may be added to a first solution at a first pH comprising alkali+small molecular weight acid species, such as a solution comprising sodium acetate, to form a second solution at a second pH comprising alkali+small molecular weight acid species+non-volatile acid species, wherein the pH of the second solution is lower than or less than the pH of the first solution. In some embodiments, a chemical comprising a non-volatile acid or acid with a low vapor pressure or acid with a lower vapor pressure than the small molecular weight acid or volatile acid large molecular weight acid or any combination thereof may comprise a large molecular weight or large MW acid. In some embodiments the second solution may be distilled, or evaporated, or crystallized, or any combination thereof, forming at least a portion of a distillate or liquid or solution comprising small molecular weight acid, such as a solution comprising acetic acid, and at least a portion of a solution or concentrate or solid or any combination thereof comprising an alkali+large MW acid, such as a solution comprising sodium+citric acid species, or a solution comprising a sodium citrate+stoichiometric excess citric acid, or a sodium citrate, or any combination thereof. Distillation may comprise including, but not limited to, one or more or any combination of the following: mechanical vapor compression distillation, or MVC, or MVR, or membrane distillation (MD), or MSF, or vacuum distillation, or simple distillation, or distillation, or extractive distillation, or thermal distillation, or evaporative distillation, or azeotropic distillation, or multi-fraction distillation, or multi-component distillation, or heat recovery distillation, or multi-stage distillation, or multi-step distillation, or mild temperature distillation, or a distillation method herein, or a distillation method in the art, or a separation method herein, or a separation method in the art, or any combination thereof.

In some embodiments, stoichiometric excess large MW acid species, such as citric acid species, relative to alkali species, such as sodium species, may be present in the solution after the substantial separation of a portion of small MW acid species, such as acetic acid species.

In some embodiments, a solution comprising alkali+large MW acid species, such as citric acid species, after the substantial separation of a portion of small MW acid species, such as acetic acid species, may comprise an acetic pH, or a pH less than 7, or a pH less 6, or a pH less than 5, or a pH less than 4, or any combination thereof. In some embodiments, the solution or the retentate solution may comprise a proportion large MW acid species, such as citric acid species relative to alkali species, such as sodium species, which may result in a relatively acetic pH, for example, after the substantial separation of at least a portion of small MW acid species, such as acetic acid species. In some embodiments, the solution or the retentate solution may comprise stoichiometric excess of large MW acid species, such as citric acid species relative to alkali species, such as sodium species, for example, after the substantial separation of at least a portion of small MW acid species, such as acetic acid species. In some embodiments, it may be desirable to remove or separation or recover at least a portion of any citric acid species by using lower energy, or lower cost, or lower $CO_2$ emitting, or any combination thereof chemical reactions, or systems, or methods, or any combination thereof. For example, in some embodiments, a chemical comprising calcium carbonate may be added or reacted with a solution to form, for example, a portion of calcium citrate, which may comprise a solid, and a portion of a solution comprising proportionally less citric acid species, or sodium carbonate, or sodium bicarbonate, or carbon dioxide, or any combination thereof. For example, in some embodiments, a material comprising calcium oxide or calcium hydroxide may be added or reacted with the solution to form, for example, a portion of calcium citrate, which may comprise a solid, and a portion of a solution comprising proportionally less citric acid species, or a solution comprising sodium hydroxide, or any combination thereof. For example, in some embodiments, a portion of a chemical comprising citric acid may be separated using a membrane-based process. For example, in some embodiments, a portion of citric acid may be separated by a process capable of separating a portion of citric acid species from a portion of sodium species, or a portion of solution comprising sodium+citric acid species+stoichiometric excess citric acid, or any combination thereof.

An example reaction sequence in some example embodiments:

- For example, in some embodiments, a first solution comprising alkali+large MW acid species, such as a solution comprising alkali+citric acid species, may be reacted with a chemical comprising an alkaline earth cation-weak acid anion, such as calcium carbonate, to form a second solution comprising alkali+large MW acid species comprising a pH higher than the first solution, or alkali cation+large MW acid species anion, such as a solution comprising an alkali citrate, and/or chemical an alkaline earth cation+large MW acid species anion, such as a chemical or solid comprising calcium citrate, and/or a chemical comprising a weak acid derivative, such as a chemical or gas comprising carbon dioxide.
- For example, in some embodiments, the second solution comprising alkali+large MW acid species at a higher pH than the first solution may be reacted with a chemical comprising an alkaline earth hydroxide, or alkaline earth oxide, or alkaline earth carbonate, or any combination thereof, such as a chemical comprising calcium hydroxide, or calcium oxide, or calcium carbonate, or any combination thereof, to form, for example, a chemical comprising an alkaline earth+large MW acid species, such as a calcium citrate and/or a third solution comprising an alkali hydroxide, or alkali carbonate, or any combination thereof.
- In some embodiments, a solution or chemical comprising an alkali hydroxide may comprise a product or output. In some embodiments, a solution or chemical comprising an alkali hydroxide may be treated, or reacted, or further treated, or further reacted, or concentrated, or any combination thereof, which may include, but may not be limited to, one or more or any combination of the following:
  - In some embodiments, a solution comprising alkali hydroxide may be reacted with carbon dioxide to form a solution, or solid, or any combination thereof comprising an alkali+carbon dioxide, such as an alkali carbonate, or alkali bicarbonate, or alkali sesquicarbonate, or any combination thereof.
  - In some embodiments, a solution comprising alkali hydroxide may undergo concentrating, or may be further concentrated, or may be crystallized, or may be distilled, or may be purified, or may be treated, or may be reacted, or any combination thereof.

An example reaction sequence in some example embodiments:

- For example, in some embodiments, a first solution comprising alkali+large MW acid species, such as a solution comprising alkali+citric acid species, may be reacted with a chemical comprising an alkaline earth cation+oxide anion or an alkaline earth cation+hydroxide anion, such as calcium oxide or calcium hydroxide, to form a second solution comprising alkali hydroxide, such as a chemical comprising sodium hydroxide, and/or chemical an alkaline earth cation+large MW acid species anion, such as a chemical or solid comprising calcium citrate.

- In some embodiments, a solution or chemical comprising an alkali hydroxide may comprise a product or output. In some embodiments, a solution or chemical comprising an alkali hydroxide may be treated, or reacted, or further treated, or further reacted, or concentrated, or any combination thereof, which may include, but may not be limited to, one or more or any combination of the following:
  - In some embodiments, a solution comprising alkali hydroxide may be reacted with carbon dioxide to form a solution, or solid, or any combination thereof comprising an alkali+carbon dioxide, such as an alkali carbonate, or alkali bicarbonate, or alkali sesquicarbonate, or any combination thereof.
  - In some embodiments, a solution comprising alkali hydroxide may undergo concentrating, or may be further concentrated, or may be crystallized, or may be distilled, or may be purified, or may be treated, or may be reacted, or any combination thereof.

An example reaction sequence in some example embodiments:

- For example, in some embodiments, a first solution comprising alkali+large MW acid species, such as a solution comprising alkali+citric acid species, may be reacted with a chemical comprising an alkaline earth cation+oxide anion or an alkaline earth cation+hydroxide anion, such as calcium oxide or calcium hydroxide, to form a second solution comprising alkali hydroxide, such as a chemical comprising sodium hydroxide, and/or chemical an alkaline earth cation+large MW acid species anion, such as a chemical or solid comprising calcium citrate.
- In some embodiments, a solution or chemical comprising an alkali hydroxide may comprise a product or output. In some embodiments, a solution or chemical comprising an alkali hydroxide may be treated, or reacted, or further treated, or further reacted, or concentrated, or any combination thereof, which may include, but may not be limited to, one or more or any combination of the following:
  - In some embodiments, a solution comprising alkali hydroxide may be reacted with carbon dioxide to form a solution, or solid, or any combination thereof comprising an alkali+carbon dioxide, such as an alkali carbonate, or alkali bicarbonate, or alkali sesquicarbonate, or any combination thereof.
  - In some embodiments, a solution comprising alkali hydroxide may undergo concentrating, or may be further concentrated, or may be crystallized, or may be distilled, or may be purified, or may be treated, or may be reacted, or any combination thereof.

In some embodiments, a chemical comprising an alkaline earth+large MW acid anion may be reacted with a chemical comprising sulfur dioxide, or sulfurous acid, or sulfite, or bisulfite, or another sulfur dioxide species, or any combination thereof to form a chemical comprising an alkaline earth sulfite, or alkaline earth bisulfite, or alkaline earth+sulfur dioxide species anion, or alkaline earth+sulfur dioxide species, or any combination thereof and/or a chemical comprising a large MW acid. In some embodiments, a solid, or solution, or any combination thereof comprising an alkaline earth+large MW acid anion may be reacted with a solution, or gas, or liquid, or solid, or any combination thereof comprising sulfur dioxide, or sulfurous acid, or sulfite, or bisulfite, or another sulfur dioxide species, or any combination thereof to form a solid comprising an alkaline earth sulfite and/or a solution comprising a large MW acid. In some embodiments, a solid comprising an calcium+large MW acid anion, such as calcium citrate, may be reacted with a solution, or gas, or liquid, or solid, or any combination thereof comprising sulfur dioxide, or aqueous sulfur dioxide, or sulfurous acid, or sulfite, or bisulfite, or another sulfur dioxide species, or any combination thereof, to form a solid comprising an calcium sulfite and/or a solution comprising a large MW acid, such as citric acid. In some embodiments, a portion of a solid formed may be separated from a portion of a liquid or solution formed using, for example, a solid-liquid separation system and/or method.

In some embodiments, a chemical comprising an alkaline earth sulfite may be reacted, or decomposed, or any combination thereof to form a portion of a chemical comprising an alkaline earth oxide, or alkaline earth hydroxide, or alkaline earth carbonate, or any combination thereof, and/or a chemical comprising sulfur dioxide, or a sulfur dioxide derivative, or sulfur derivative, or any combination thereof. In some embodiments, a chemical comprising a solid comprising calcium sulfite may be reacted, or decomposed, or any combination thereof to form a portion of a chemical comprising a solid comprising calcium oxide, or calcium hydroxide, or calcium carbonate, or any combination thereof, and/or a chemical comprising sulfur dioxide, or a sulfur dioxide derivative, or sulfur derivative, or any combination thereof. In some embodiments, a chemical comprising an alkaline earth oxide, such as calcium oxide, may be reacted with a chemical comprising water to produce a chemical comprising an alkaline earth hydroxide, such as calcium hydroxide. In some embodiments, a portion of heat may be recovered from the reaction of a chemical comprising an alkaline earth oxide with a chemical comprising water. In some embodiments, a chemical comprising an alkaline earth oxide may be employed to facilitate the dehydration, or drying, or any combination thereof of a chemical comprising an alkaline earth sulfite. For example, in some embodiments, it may be desirable to dry, or dehydrate or partially dehydrate, or any combination thereof a chemical comprising an alkaline earth sulfite prior to, or during, or any combination thereof the reacting or decomposition of the chemical comprising an alkaline earth sulfite.

Example Chemistry Description of Some Embodiments

Example Embodiment Comprising Production of Alkali Hydroxide using Large Molecular Weight Acid and Small molecular weight Weak Acid Intermediates, which may include, but may not be limited to, one or more or any combination of the following steps:

(1) Reacting a component comprising an alkaline earth with a component comprising a small molecular weight weak acid to form a component comprising an alkaline earth—small molecular weight weak acid anion. May comprise, including, but not limited to, one or more or any combination of the following:

$$Ca(WA)(s) + 2\ Low\ MW\ Acid(aq) \longrightarrow Ca(Low\ MW\ Anion)_2(aq) + WA\ Derivative$$

-continued $$CaCO_3(s) + 2\ CH_3COOH(aq) \longrightarrow Ca(CH_3COO)_2(aq) + H_2O(aq) + CO_2(g)$$

In some embodiments, the $CO_2$ may comprise high purity, or high partial pressure, or captured $CO_2$.

(2) Reacting a component comprising an alkaline earth—small molecular weight weak acid anion with a component comprising an alkali sulfate to form a component comprising an alkaline earth sulfate and a component comprising an alkali—small molecular weight weak acid anion. May comprise, including, but not limited to, one or more or any combination of the following:

$$Ca(Low\ MW\ Anion)_2(aq) + Na_2SO(aq) \longrightarrow CaSO_4(s) + 2\ Na(Low\ MW\ Anion)(aq)$$

$$Ca(CH_3COO)_2(aq) + Na_2SO_4(aq) \longrightarrow CaSO_4(s) + 2\ NaCH_3COO(aq)$$

(3) Adding or mixing a component comprising a large molecular weight acid to or with a component comprising an alkali—small molecular weight weak acid anion, and/or separating a portion of a component comprising a small molecular weight weak acid from a component comprising an alkali. May comprise, including, but not limited to, one or more or any combination of the following:

$$2\ Na(Low\ MW\ Anion)(aq) + Large\ MW\ Acid \longrightarrow 2\ Na(Large\ MW\ Anion)(aq) + Low\ MW\ Acid(aq)$$

$$2\ NaCH_3COO + Citric\ Acid \longrightarrow 2\ Na(Citrate)(aq\ or\ s) + 2\ CH_3COOH(aq)$$

$$2\ NaCH_3COO + Citric\ Acid \longrightarrow 2\ Na(Citrate)(aq\ or\ s) + 2\ CH_3COOH(aq)$$

(with membrane based or membrane facilitated process or other processes, for such as, for example, reverse osmosis or nanofiltration, or other system and method, or any combination thereof)

Note: In some embodiments, a portion of $NACH_3COO$ may be recirculated

Note: In some embodiments, a portion of 2 Na(Citrate) (aq or s) may be separated from, for example, a portion of $NACH_3COO$(aq or s)

(4) Reacting a component comprising an alkaline earth hydroxide, or alkaline earth oxide, or any combination thereof with a component comprising an alkali-large molecular weight acid anion to form, for example, a component comprising an alkaline earth-large molecular weight acid anion and a component comprising an alkali hydroxide.

$$2\ Na(Large\ MW\ Anion)(aq) + Ca(OH)_2 \longrightarrow 2NaOH + Ca(Large\ MW\ Anion)(s\ or\ aq)$$

-continued $$2\ Na(Citrate)(aq) + CaO + H_2O \longrightarrow 2NaOH + Ca(Citrate)(s\ or\ aq)$$

$$2\ Na(Citrate)(aq) + Ca(OH)_2 \longrightarrow 2NaOH + Ca(Citrate)(s\ or\ aq)$$

Note: In some embodiments, at least a portion of the alkali hydroxide may be separated from at least a portion of the alkaline earth-large molecular weight acid anion, or at least a portion of the alkaline earth-large molecular weight acid anion may be separated from at least a portion of the alkali hydroxide. For example, in some embodiments, nanofiltration may be employed. For example, in some embodiments, a solid-liquid separation may be employed.

Note: In some embodiments, the alkali hydroxide may be treated, or further treated, or purified, or any combination thereof. In some embodiments, for example, a solution comprising an alkali hydroxide may be, for example, including, but not limited to, one or more or any combination of the following: further concentrated, or a solid comprising an alkali hydroxide may be crystalized, or alkali hydroxide may be reacted to form a derivative, or alkali hydroxide may be reacted, or any combination thereof.

(5) Reacting a component comprising an alkaline earth-large molecular weight acid anion with an acid comprising a stronger acid to form, for example, a component comprising an alkaline earth-stronger acid anion and a component comprising a large molecular weight acid.

$$Ca(Large\ MW\ Anion)(s\ or\ aq) + Stronger\ Acid \longrightarrow Ca(Stronger\ Acid\ Anion)(s\ or\ aq) + Large\ MW\ Acid(aq\ or\ s)$$

$$Ca(Citrate)(s\ or\ aq) + SO_2(aq\ or\ g\ or\ l) + H_2O \longrightarrow CaSO_3(s) + Citric\ Acid(aq)$$

(6) Decomposing a component comprising an alkaline earth-stronger acid anion to form at least a portion of a component comprising an alkaline earth oxide, or alkaline earth hydroxide, or any combination thereof and a component comprising a stronger acid, or a stronger acid derivative, or any combination thereof.

$$Ca(Stronger\ Acid\ Anion)(s) \longrightarrow CaO(s) + Stronger\ Acid\ Derivative(g)$$

$$CaSO_3(s) \longrightarrow CaO(s) + SO_2(g)$$

Note: In some embodiments, may employ thermal, or electrochemical, or photochemical, or any combination thereof decomposition. Some embodiments, for example, may employ a kiln or calciner.

Example pH vs. Speciation of Citric Acid and Acetic Acid in Aqueous Solutions In some embodiments, a component comprising acetic acid may comprise an example small molecular weight weak acid, or small molecular weight acid, or low molecular weight weak acid, or potentially permeable acid species, or monovalent weak acid, or any combination thereof, and/or other chemicals which may comprise a small molecular weight acid, low molecular weight acid, or potentially permeable acid species, or monovalent weak acid, or potentially volatile acid, or pH sensitive volatile acid, or any combination thereof may be employed instead of or in addition to, acetic acid or acetate or acetic acid species. In some embodiments, a chemical comprising acetic acid may comprise an example small molecular weight acid, or small MW acid, or low molecular weight weak acid, or potentially permeable acid species, or monovalent weak acid, or any combination thereof, and/or other chemicals which may comprise a small molecular weight acid, or low molecular weight weak acid, or potentially permeable acid species, or monovalent weak acid, or potentially volatile acid, or pH sensitive volatile acid, or any combination thereof may be employed instead of or in addition to, acetic acid or acetate or acetic acid species, where, for example, acetic acid or acetate or acetic acid species or any combination thereof may be described. In some embodiments, a small molecular weight weak acid may comprise an acid or acid species which may possess molecular weight less than or equal to, for example, including, but not limited to, one or more or any combination of the following: 50 g/mol, or 100 g/mol, or 125 g/mol, or 150 g/mol, or 175 g/mol, or 200 g/mol, or 225 g/mol, or 250 g/mol. In some embodiments, for example, a potentially permeable acid species may comprise a species which may permeable a reverse osmosis and/or nanofiltration membrane. In some embodiments, for example, a potentially permeable acid species may comprise a species which may permeable a reverse osmosis and/or nanofiltration membrane wherein the rejection rate may be less than or equal to one or more or any combination of the following: 99%, or 97%, or 95%, or 80%, or 70%, or 60%, or 50%, or 40%, or 30%, or 35%, or 20%, or 15%, or 10%, or 5%, or 3%, or 1%.

In some embodiments, a component comprising citric acid may comprise an example large molecular weight weak acid, or potentially retained acid species, or potentially rejected acid species, or a multivalent weak acid, or any combination thereof, and/or other chemicals which may comprise large molecular weight acid, or large MW acid, or potentially retained acid species, or potentially rejected acid species, or a multivalent weak acid, or nonvolatile acid, or potentially nonvolatile acid, or any combination thereof may be employed instead of or in addition to, citric acid or citrate or citric acid species. In some embodiments, a component comprising citric acid may comprise an example large molecular weight weak acid, or potentially retained acid species, or potentially rejected acid species, or a multivalent weak acid, or any combination thereof, and/or other chemicals which may comprise large molecular weight weak acid, or potentially retained acid species, or potentially rejected acid species, or a multivalent weak acid, or any combination thereof may be employed instead of or in addition to, citric acid or citrate or citric acid species, where, for example, citric acid or citrate or citric acid species or any combination thereof may be described. In some embodiments, a large molecular weight acid may comprise an acid or acid species which may possess molecular weight greater than or equal to, for example, including, but not limited to, one or more or any combination of the following: 50 g/mol, or 100 g/mol, or 125 g/mol, or 150 g/mol, or 175 g/mol, or 200 g/mol, or 225 g/mol, or 250 g/mol. In some embodiments, a large molecular weight acid may comprise an acid or acid species which may possess molecular weight greater than the molecular weight of a small molecular weight acid in the same system or process. In some embodiments, a large molecular weight acid may comprise an acid or acid species which may possess vapor pressure less than the pressure of a small molecular weight acid in the same system or process. In some embodiments, a large molecular weight acid may comprise an acid or acid species which may possess vapor pressure less than the pressure of a small molecular weight acid in the same system or process at the same pH and/or same concentration. In some embodiments, for example, a potentially rejected or retained acid species may comprise a species which may be at least partially rejected by a reverse osmosis and/or nanofiltration membrane, or may possess a greater rejection rate or rejection percentage, or lower permeation rate or permeation percentage, or any combination thereof than the permeable acid species. In some embodiments, for example, a potentially retained or rejected acid species may comprise a species which may exhibit a rejection rate may be greater than or equal to one or more or any combination of the following: 99%, or 97%, or 95%, or 80%, or 70%, or 60%, or 50%, or 40%, or 30%, or 35%, or 20%, or 15%, or 10%, or 5%, or 3%, or 1%.

In some embodiments, a pH in the range of less than about 5.5 may facilitate at least partially separating at least a portion of a chemical species comprising acetic acid species, such as $CH_3COOH$, from at least a portion of a species comprising an alkali, such as sodium, or potassium, or lithium, or ammonia, or rubidium, or caesium, or any combination thereof.

In some embodiments:

- Adding a portion of a chemical or solution comprising citric acid may decrease pH. Removing a portion of a chemical or solution comprising citric acid may increase pH.
- Removing or separating acetic acid and/or citric acid from the solution comprising sodium+citric acid+acetic solution may increase solution pH.
- Adding a base, such as calcium carbonate, may increase pH. For example, the pH may shift from acidic to basic, for example, if a base may be added in an amount sufficient to neutralize free acid species.

In some embodiments, it may be desirable to add a large molecular weight weak acid, such as citric acid, to enable or facilitate a pH wherein at least a portion of small molecular weight weak acid species, such as acetic acid or acetate, may comprise non-ionic weak acid species, such as acetic acid, or a more permeable species relative to the large molecular weight weak acid. In some embodiments, at least a portion of small molecular weight weak acid species may permeate a semi-permeable membrane, while at least a portion of alkali species, such as sodium or potassium or lithium, may be retained by or rejected by the semi-permeable membrane and/or at least a portion of the large molecular weight acid species, such as citric acid, may be retained by or rejected by the semi-permeable membrane. In some embodiments, a permeate comprising small molecular weight acid may form, while, for example, a retentate comprising alkali+large molecular weight acid species may form. In some embodiments, the retentate may comprise a molar ratio of alkali: small molecular weight acid species greater than the permeate. In some embodiments, the retentate may comprise a molar ratio of sodium: small molecular weight acid species greater than the related feed.

Figure 2A:
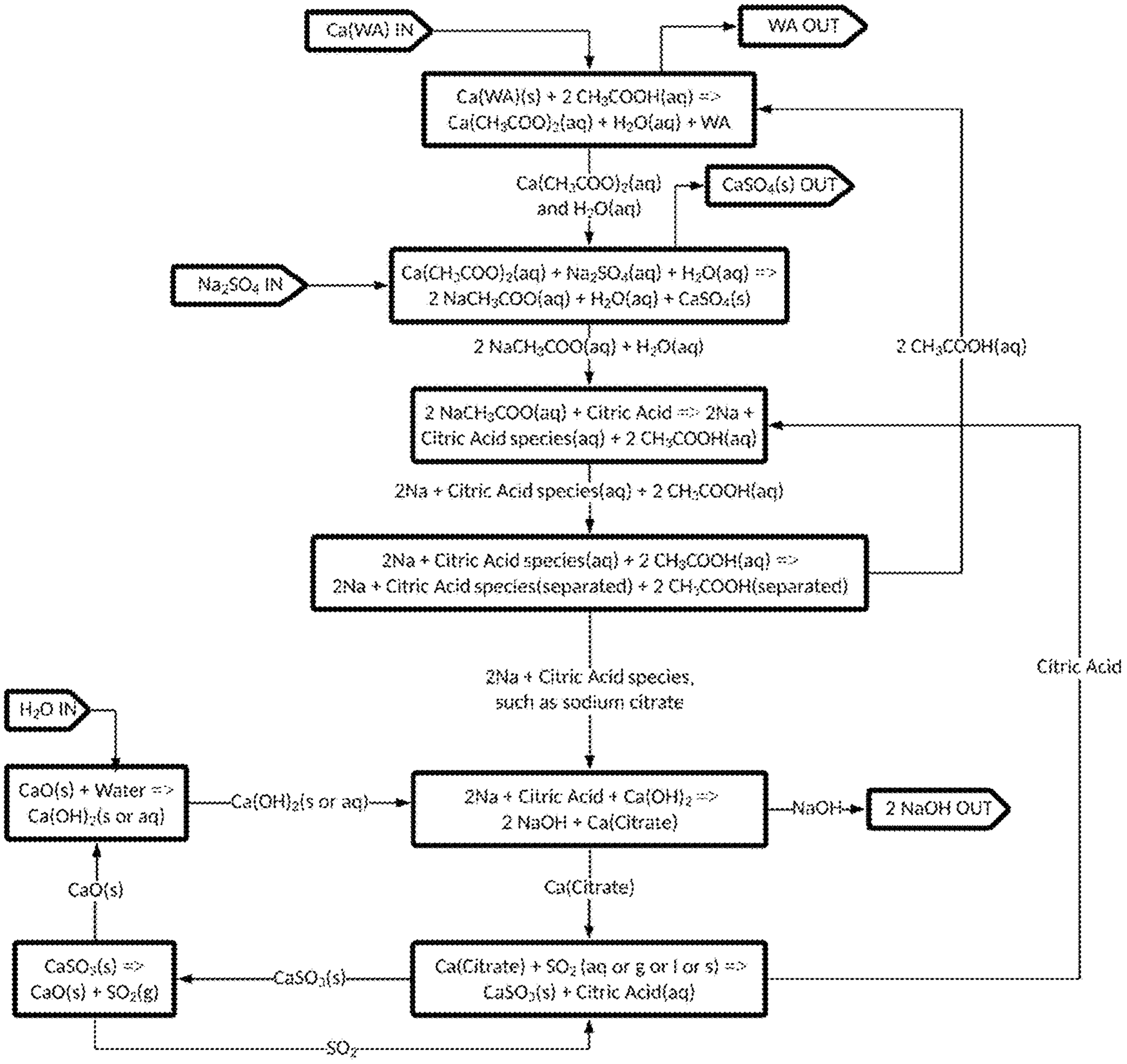
FIG. 2A: Embodiment producing alkali hydroxide from alkali sulfate using small molecular weight acid species and large molecular weight acid species with alkaline earth cation—weak acid derivative anion input.
Figure 2B:
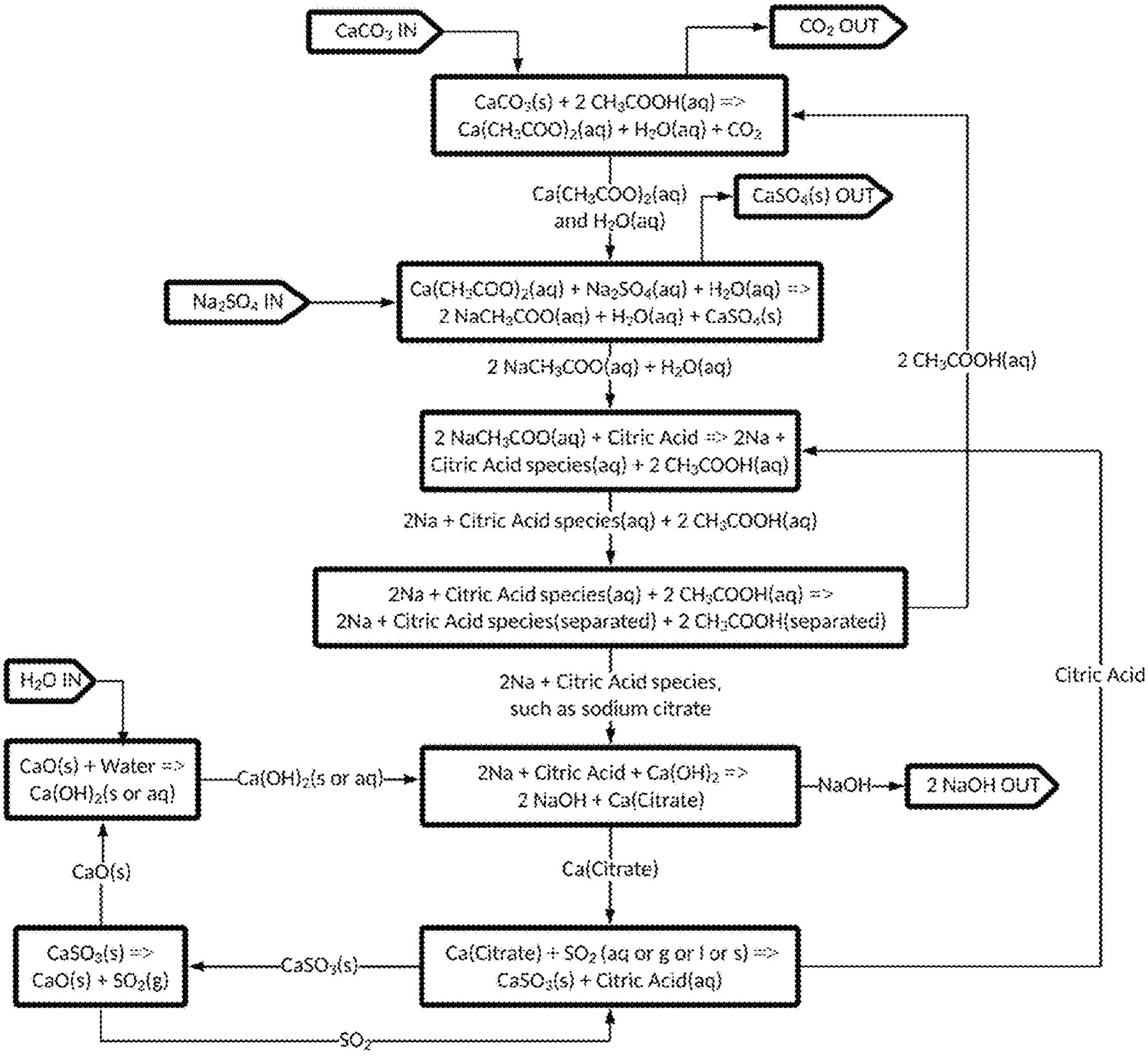
FIG. 2B: Embodiment producing alkali hydroxide from alkali sulfate using intermediates comprising acetic acid species and citric acid species with calcium carbonate input.
Figure 2C:
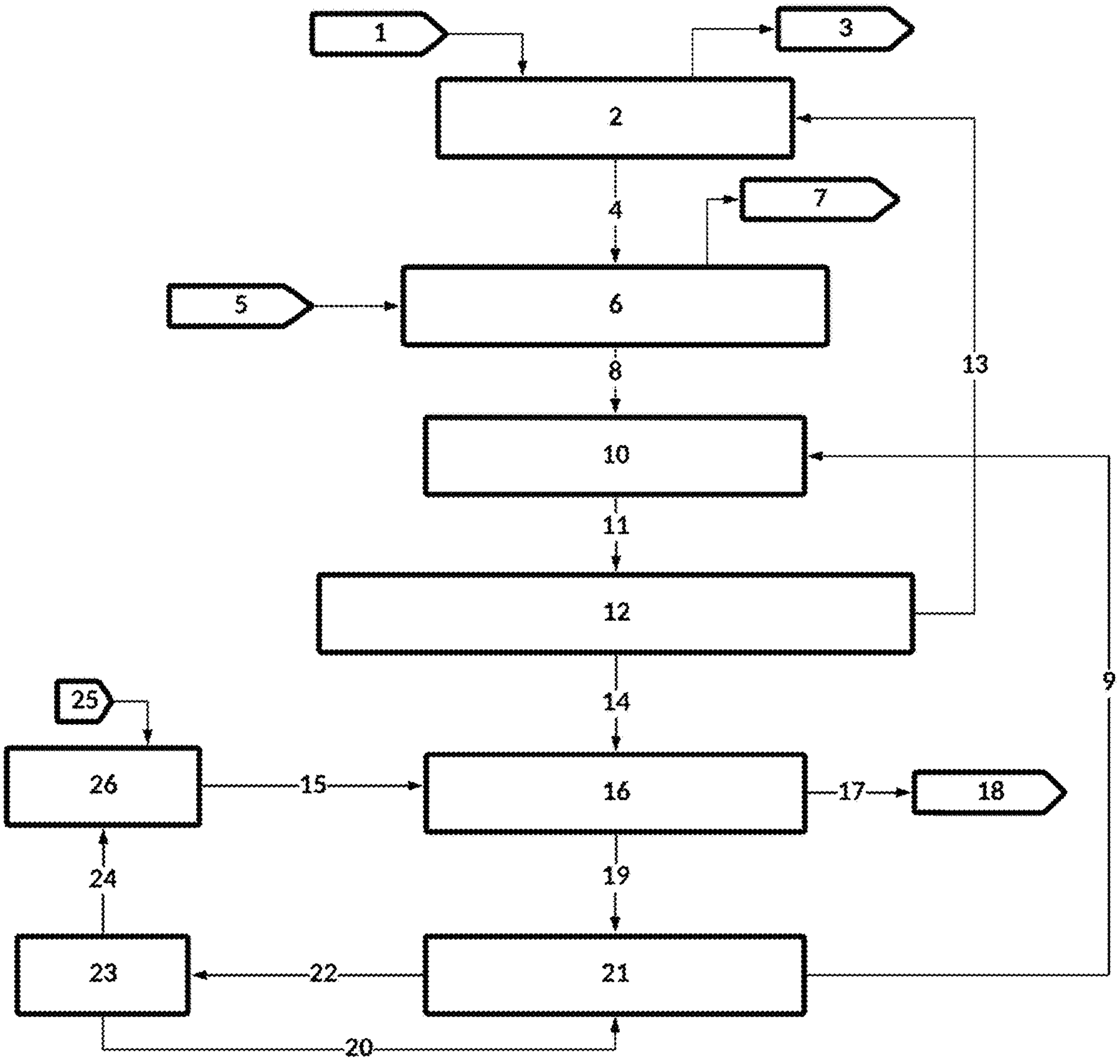
FIG. 2C: Embodiment producing alkali hydroxide from alkali sulfate using small molecular weight acid species and large molecular weight acid species with alkaline earth cation—weak acid derivative anion input, with numerical labels.

Example FIG. 2A, FIG. 2B, 2C Description

Example FIG. 2A, FIG. 2B, FIG. 2C Summary

Example FIG. 2C Simplified Step-by-Step Description, May Include, but May not be Limited to, One or More or any Combination of the Following 1. Reacting Alkaline Earth with Small MW Weak Acid, for example, may comprise: Reacting a solid comprising calcium carbonate with a solution comprising acetic acid to form a solution comprising calcium acetate and a gas comprising carbon dioxide.
2. Reacting Alkaline Earth+Small MW Weak Acid Anion with an Alkali Sulfate, for example, may comprise: Reacting a solution comprising calcium acetate with a solid, or solution, or any combination thereof comprising an alkali sulfate to form at least a portion of a solid comprising calcium sulfate and a solution comprising an alkali acetate.
3. Reacting or Mixing Alkali+Small MW Weak Acid Anion with a Large MW Weak Acid anion, for example, may comprise: Reacting or mixing a solution or solid or any combination thereof comprising an alkali acetate with a solution or liquid or solid or any combination thereof comprising citric acid and/or treating or performing or operating or any combination thereof in a manner to form a portion of a component comprising an alkali citrate or alkali+citric acid and a portion of a component comprising acetic acid.
4. Reacting Alkali+Large MW Weak Acid anion with an Alkaline Earth, for example, may comprise: Reacting a chemical comprising an alkali citrate or alkali+citric acid with a chemical comprising calcium, such as calcium hydroxide or calcium carbonate or calcium oxide or calcium bicarbonate, to form a chemical comprising an alkali hydroxide or alkali carbonate or alkali bicarbonate or any combination thereof, and a chemical comprising a calcium citrate. In some embodiments, a chemical comprising calcium citrate may form, wherein at least a portion of the chemical comprising calcium citrate may comprise a solid. In some embodiments, the chemical comprising an alkali hydroxide or alkali carbonate or alkali bicarbonate or any combination thereof may comprise a valuable product.
5. Reacting an Alkaline Earth+Large MW Weak Acid anion with Sulfurous Acid or Sulfur Dioxide or Sulfite, or Bisulfite, or Metabisulfite, or other Sulfur Dioxide Species, for example, may comprise: Reacting a chemical comprising calcium citrate with a chemical comprising sulfur dioxide, or sulfurous acid, or aqueous sulfur dioxide, or sulfite, or bisulfite or metabisulfite, or other sulfur dioxide species, or any combination thereof to form, for example, a chemical comprising calcium sulfite, or calcium bisulfite, or any combination thereof and a chemical comprising citric acid.
6. Reacting or Decomposing an Alkaline Earth Sulfite, for example, may comprise: Reacting or decomposing a chemical comprising calcium sulfite to form a chemical comprising calcium oxide, or calcium hydroxide, or calcium carbonate, or calcium sulfide, or any combination thereof and a chemical comprising sulfur dioxide, or sulfur trioxide, or sulfurous acid, or aqueous sulfur dioxide, or sulfite, or bisulfite, or metabisulfite, or other sulfur dioxide species, or any combination thereof.

Example FIG. 2C Simplified Step-by-Step Description, May Include, but May not be Limited to, One or More or any Combination of the Following 1. Reacting Alkaline Earth with Small MW Weak Acid, for example, may comprise: Reacting a solid comprising magnesium carbonate, or magnesium oxide, or magnesium sulfide, or any combination thereof may be reacted with a solution comprising acetic acid to form a solution comprising magnesium acetate and a chemical comprising carbon dioxide, or hydrogen sulfide, or water, or any combination thereof.
2. Reacting Alkaline Earth+Small MW Weak Acid Anion with an Alkali Sulfate, for example, may comprise: Reacting a solution comprising magnesium acetate with a solid, or solution, or any combination thereof comprising an alkali sulfate to form a solution comprising magnesium, or sulfate, or acetate, or any combination thereof. In some embodiments, a portion of a chemical comprising magnesium sulfate may be separated from a portion of a chemical comprising alkali acetate, using, for example, including, but not limited to, nanofiltration, or electrodialysis, or electrodialysis metathesis, or other separation method, or other reaction method, or any combination thereof. In some embodiments, the magnesium sulfate may be thermally decomposed or otherwise treated, or otherwise reacted, or any combination thereof to form magnesium oxide, or magnesium carbonate, or magnesium sulfide, or any combination thereof and/or form a chemical comprising sulfur dioxide, or sulfur trioxide, or sulfuric acid, or oxygen, or any combination thereof.
3. Reacting or Mixing Alkali+Small MW Weak Acid Anion with a Large MW Weak Acid anion, for example, may comprise: Reacting or mixing a solution or solid or any combination thereof comprising an alkali acetate with a solution or liquid or solid or any combination thereof comprising citric acid and/or treating or performing or operating or any combination thereof in a manner to form a portion of a component comprising an alkali citrate or alkali+citric acid and a portion of a component comprising acetic acid.
4. Reacting Alkali+Large MW Weak Acid anion with an Alkaline Earth, for example, may comprise: Reacting a chemical comprising an alkali citrate or alkali+citric acid with a chemical comprising calcium, such as calcium hydroxide or calcium carbonate or calcium oxide or calcium bicarbonate, to form a chemical comprising an alkali hydroxide or alkali carbonate or alkali bicarbonate or any combination thereof, and a chemical comprising a calcium citrate. In some embodiments, a chemical comprising calcium citrate may form, wherein at least a portion of the chemical comprising calcium citrate may comprise a solid. In some embodiments, the chemical comprising an alkali hydroxide or alkali carbonate or alkali bicarbonate or any combination thereof may comprise a valuable product.
5. Reacting an Alkaline Earth+Large MW Weak Acid anion with Sulfurous Acid or Sulfur Dioxide or Sulfite, or Bisulfite, or Metabisulfite, or other Sulfur Dioxide Species, for example, may comprise: Reacting a chemical comprising calcium citrate with a chemical comprising sulfur dioxide, or sulfurous acid, or aqueous sulfur dioxide, or sulfite, or bisulfite or metabisulfite, or other sulfur dioxide species, or any combination thereof to form, for example, a chemical comprising calcium sulfite, or calcium bisulfite, or any combination thereof and a chemical comprising citric acid.
6. Reacting or Decomposing an Alkaline Earth Sulfite, for example, may comprise: Reacting or decomposing a chemical comprising calcium sulfite to form a chemical comprising calcium oxide, or calcium hydroxide, or calcium carbonate, or calcium sulfide, or any combination thereof and a chemical comprising sulfur dioxide, or sulfur trioxide, or sulfurous acid, or aqueous sulfur dioxide, or sulfite, or bisulfite, or metabisulfite, or other sulfur dioxide species, or any combination thereof.

Example FIG. 2C Detailed Step-by-Step Description of an Example Embodiment with Example Parameters Example FIG. 2C Example Detailed Step-by-Step Description of an Example Embodiment with Example Parameters

| Related Label | Description |
|---|---|
| 2 | In some embodiments, a solid comprising calcium carbonate is mixed with or reacted with a liquid or solid or solution comprising acetic acid in a reactor forming a solution comprising calcium acetate and a gas comprising carbon dioxide. In some embodiments, the solution comprising acetic acid may comprise a permeate and/or may comprise an acetic acid concentration of less than, or greater than, or equal to, one or more or any combination of the following: 0.05M, or 0.1M, or 0.2M, or 0.3M, or 0.4M, or 0.5M, or 0.75M, or 1.00M, or 1.25M, or 1.5M, or 1.75M, or 2.00M, or 2.25M, or 2.5M, or 3M, or 3.5M, or 4M, or 4.5M, or 5M or any combination thereof. In some embodiments, the solution comprising acetic acid may comprise a distillation and/or may comprise an acetic acid concentration of less than, or greater than, or equal to, one or more or any combination of the following: 0.5M, or 0.75M, or 1.00M, or 1.25M, or 1.5M, or 1.75M, or 2.00M, or 2.25M, or 2.5M, or 3M, or 4M, or 5M, or 6M, or 7M, or 8M, or 9M, or 10M, or 15M, or 20M, or acetic acid concentrate, or acetic acid, or any combination thereof. In some embodiments, it may be desirable for the gas comprising carbon dioxide to comprise a high partial pressure, or high purity, or captured, or any combination thereof carbon dioxide. In some embodiments, the solution comprising calcium acetate may undergo concentrating, for example, which may include, but may not be limited to, employing one or more or any combination of the following: reverse osmosis, or nanofiltration, or electrodialysis, |

-continued

| Related Label | Description |
|---|---|
| | or distillation, or MD, or MSF, or MVC, or other concentrating system or method, or other separation system or method, or any combination thereof. In some embodiments, the reactor may comprise, for example, which may include, but may not be limited to, employing one or more or any combination of the following: a mixing reactor, or a continuous stirred reactor, or solid-liquid mixing reactor, or a gas forming reactor, or a batch reactor, or a semi-batch reactor, or continuous reactor, or multi-stage reactor, any combination thereof.<br>In some embodiments, at least a portion of the solution comprising acetic acid may be formed in or from '12'.<br>In some embodiments, a chemical comprising calcium carbonate may comprise an input.<br>In some embodiments, a gas comprising carbon dioxide may be an output or may be used in some embodiments, for example, to make a chemical comprising a carbonate, or bicarbonate, or any combination thereof.<br>In some embodiments, a solution or chemical comprising calcium acetate may be transferred to '6'. |
| 6 | In some embodiments, a solution comprising calcium acetate may be reacted with a solid, or solution, or any combination thereof comprising sodium sulfate to form, for example, a solid comprising calcium sulfate and a solution comprising sodium acetate. In some embodiments, a reaction of a solid, or solution, or any combination thereof comprising sodium sulfate and a solution comprising calcium acetate may be conducted in a manner, or under conditions, or under concentrations, or any combination thereof to facilitate the formation of at least a portion of a precipitate comprising calcium sulfate and a solution comprising at least a portion of sodium acetate. In some embodiments, for example, it may be desirable for the concentration of the reactant comprising calcium acetate to be greater than or equal to one or more or any combination of the following: 0.25M, or 0.5M, or 1M, or 1.5M, or 2M, or 2.25M, or 2.5M, or 3M, or 4M, or 5M, or solid calcium acetate. In some embodiments, for example, it may be desirable for the concentration of the reactant comprising sodium sulfate to be greater than or equal to one or more or any combination of the following: 0.25M, or 0.5M, or 1M, or 1.5M, or 2M, or 2.25M, or 2.5M, or 3M, or 4M, or 5M, or solid calcium acetate.<br>In some embodiments, it may be desirable to separate a portion of any impurities or other salts or chemicals from a solution comprising sodium acetate. For example, in some embodiments, a portion of chemicals comprising impurities may comprise one or more or any combination of the following: divalent ions, or multivalent ions, or heavy metals, or sulfates, or sulfites, or phosphates, or metals, or any combination thereof. In some embodiments, membrane based process may be employed to separate some impurities. In some embodiments, ion exchange may be employed to separate some impurities. In some embodiments, nanofiltration may be employed to separate a portion of ions comprising divalent or multivalent ions from a portion of monovalent ions, or separate a portion of ions comprising monovalent ions from a portion of ions comprising divalent or multivalent ions, or any combination thereof.<br>In some embodiments, nanofiltration may be employed to separate a portion of heavy metal ion impurities and/or residual calcium sulfate or sulfate from a solution comprising sodium acetate.<br>In some embodiments, it may be desirable to remove or recover a portion of residual or dissolved calcium. For example, in some embodiments, calcium sulfate may be partially soluble in water or in the solution, and/or it may be desirable to remove or treat at least a portion of residual calcium or calcium sulfate to, for example, prevent scaling, or fouling, or any combination thereof. For example, in some embodiments, a chemical comprising sulfur dioxide, or sulfurous acid, or sulfite, or bisulfite, or carbonate, or bicarbonate, or citrate, or a derivative thereof, or any combination thereof may be added to or reacted with a solution comprising a portion of calcium or calcium sulfate, which may result in the formation of a portion of a precipitate comprising calcium which may be separated using, for example, a solid-liquid separation. For example, in some embodiments, a chemical comprising sulfur dioxide, or sulfurous acid, or sulfite, or bisulfite, or carbonate, or bicarbonate, or citrate, or a derivative thereof, or any combination thereof may be added to or reacted with a solution comprising sodium acetate and calcium sulfate, which may result in the formation of a portion of a precipitate comprising calcium which may be separated using, for example, a solid-liquid separation.<br>For example, in some embodiments, an antiscalant or calcium precipitation inhibitor or any combination thereof may be added to, for example, the solution comprising sodium acetate, to, for example, prevent or minimize potential scaling or fouling related to the presence of calcium, or calcium sulfate, or any combination thereof.<br>In some embodiments, it may be desirable to dilute or reduce the concentration of a solution comprising sodium acetate. For example, in some embodiments, a solution comprising sodium acetate may be diluted using, for example, a portion of water recovered from a concentrating of a solution comprising calcium acetate, in, for example, '1'. In some embodiments, for example, a solution comprising calcium acetate may be exchanged with a solution comprising sodium acetate in the presence of a semi-permeable membrane to enable or facilitate transfer of water from a solution |

Example FIG. 2C Example Detailed Step-by-Step Description of an Example Embodiment with Example Parameters -continued Example FIG. 2C Example Detailed Step-by-Step Description of an Example Embodiment with Example Parameters

| Related Label | Description |
|---|---|
| | comprising calcium acetate to a solution comprising sodium acetate using, for example, forward osmosis, or osmotically assisted reverse osmosis, or osmotically assisted nanofiltration, or any combination thereof, which may reduce energy consumption, or cost, or size, or any combination thereof, In some embodiments, it may be desirable to dilute the concentration of a solution comprising sodium acetate to enable or facilitate separation of acetic acid using a membrane based process, such as reverse osmosis or nanofiltration, in, for example '10' and/or '12'.<br>In some embodiments, it may be desirable for the solution comprising sodium acetate to be at a concentrated state, or under concentrating, or to be further concentrated, or any combination thereof. For example, in some embodiments, it may be desirable for a solution comprising sodium acetate to be at a relatively high concentration to, for example, enable the formation of a solution comprising a higher concentration of acetic acid in '10' and/or '12'. In some embodiments, for example, it may be desirable for a solution comprising sodium acetate to be at a relatively high concentration to, for example, reduce the energy consumption involved with distillation, or gas-liquid separation, or any combination thereof, for example, in some embodiments comprising a distillation, or gas-liquid separation, or any combination thereof in '10' and/or '12'. |
| 10 and/ or 12 | In some embodiments, a chemical comprising sodium acetate may be mixed with or reacted with a chemical comprising citric acid. In some embodiments, a solution, or solid, or any combination thereof may be mixed with or reacted with a solution, or solid, or any combination thereof comprising citric acid. In some embodiments, In some embodiments, a chemical comprising sodium acetate may be mixed with or reacted with a chemical comprising citric acid to form a solution comprising sodium + citric acid species + acetic acid species.<br>In some embodiments, a chemical comprising sodium, or a chemical comprising acetic acid species, or a chemical comprising citric acid species, or any combination thereof may be reacted and/or treated in a manner to form a portion of a chemical comprising sodium + citric acid species and a chemical comprising acetic acid species.<br>In some embodiments, a solution comprising sodium + citric acid species + acetic acid species may be separated in a manner to form, for example, a portion of a solid or solution comprising sodium + citric acid species and/or a solution or vapor or any combination thereof comprising acetic acid species.<br>In some embodiments, a chemical comprising citric acid may be added to and/or reacted with a solution comprising sodium + acetic acid species, and/or the formed solution may be at least partially separated in the presence of a semi-permeable membrane into a portion of a retentate solution comprising sodium + citric acid species and a permeate solution comprising acetic acid species.<br>In some embodiments, a chemical comprising citric acid may be added to and/or reacted with a solution comprising sodium + acetic acid species, and/or the formed solution may be distilled, or evaporated, or crystalized, or any combination thereof to form, for example, a solution or solid or any combination thereof comprising sodium + citric acid species, and a vapor or distillate comprising acetic acid, or water, or aqueous acetic acid, or any combination thereof.<br>In some embodiments, a solution comprising sodium + citric acid may comprise a stoichiometric excess of citric acid relative to sodium. In some embodiments, a chemical comprising calcium, such as calcium carbonate or calcium hydroxide or calcium oxide, may be reacted with a portion of the solution to form, for example, a portion of a chemical comprising calcium citrate and/or remove a portion of any excess citric acid species.<br>In some embodiments, for example, sodium + citric acid species may comprise less than, or greater than, or equal to, including, but not limited to, one or more or any combination of the following: 0.01:1, or 0.05:1, or 0.1:1, or 0.15:1, or 0.2:1, or 0.3:1, or 0.4:1, or 0.5:1, or 0.6:1, or 0.7:1, or 0.8:1, or 0.9:1, or 1:1, or 1:1.1, or 1:1.2, or 1:1.3, or 1:1.5, or 1:1.75, or 1:2, or 1:2.5, or 1:3, or 1:3.5, or 1:4, or 1:4.5, or 1:5, or 1:5.5, or 1:6, or 1:6.5, or 1:7, or 1:7.5, or 1:8, or 1:8.5, or 1:9, or 1:9.5, or 1:10, or 100:1, or 75:1, or 50:1, or 25:1, or 10:1, or 9:1, or 8:1, or 7:1, or 6:1, or 5.5:1, or 5:1, or 4.5:1, or 4:1, or 3.5:1, or 3:1, or 2.5:1, or 2:1, or 1.5:1, or 1:1.<br>In some embodiments, sodium + citric acid species, or sodium citrate, or any combination thereof may comprise, including, but not limited to, one or more or any combination of the following: trisodium citrate, or disodium citrate, or monosodium citrate, or excess citric acid, or any ratio or presence of sodium and citric acid species in the presence of each other.<br>In some embodiments, calcium + citric acid species, or calcium citrate, or any combination thereof may comprise, including, but not limited to, one or more or any combination of the following: tricalcium citrate, or dicalcium citrate, or monocalcium citrate, or excess citric acid, or any ratio or presence of calcium and citric acid species in the presence of each other.<br>In some embodiments, an ion exchange may be employed to remove a portion of any excess citric acid species, or any stoichiometric excess citric acid species, or any combination thereof. In some embodiments, an ion exchange may release a portion |

-continued

Figure 1B:
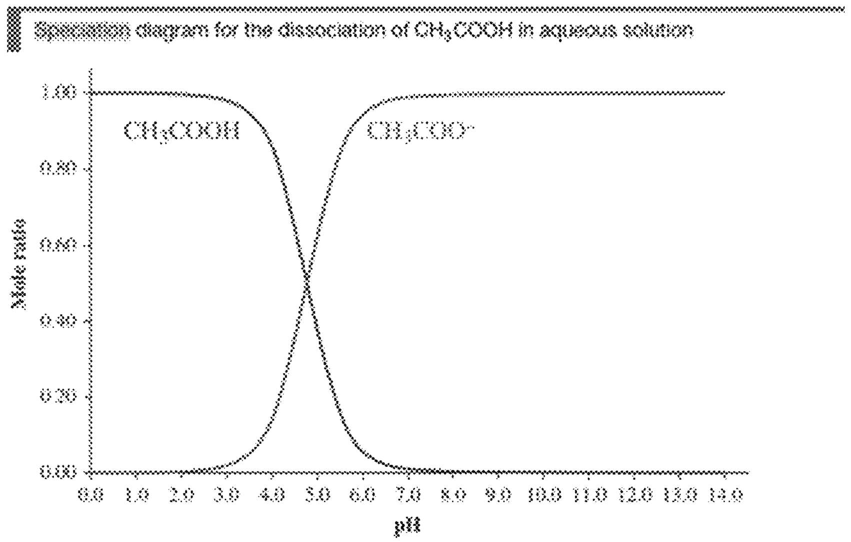
FIG. 1B: Acetic acid speciation vs. pH

| Related Label | Description |
|---|---|
| | of any excess citric acid species, or any stoichiometric excess citric acid species, or any combination thereof.<br>In some embodiments, it may be desirable for the solution comprising sodium + citric acid species + acetic acid species to be in a concentration range and/or pH range to enable or facilitate the separation of a portion of acetic acid species, such as acetic acid, from a portion of sodium + citric acid species.<br>For example, in some embodiments, it may be desirable to form a solution in a pH range such that at least a portion of the acetic acid species comprise non-ionic species and/or may be permeable through a semi-permeable membrane, such as a reverse osmosis or nanofiltration membrane. For example, in some embodiments, it may be desirable to form a solution in a pH range such that at least a portion of the acetic acid species comprise non-ionic species. For example, in some embodiments, it may be desirable to form a solution in a pH range such that at least a portion of the acetic acid species comprise non-ionic species, and/or, in some embodiments, FIG. 1B may provide a useful reference for an example speciation of acetic acid species in some aqueous solutions at some concentrations. For example, in some embodiments, it may be desirable for the pH range during the separation of a portion of a chemical comprising acetic acid to be less than or equal to one or more or any combination of the following: 7, or 6.5, or 6, or 5.5, or 5.25, or 5, or 4.75, or 4.5, or 4.25, or 4, or 3.75, or 3.5, or 3.25, or 3.00, or 2.75, or 2.50, or 2, or 1.5.<br>For example, for some membrane based processes, it may be desirable for the concentration or osmotic pressure to be sufficiently low to enable permeation of a solution comprising acetic acid through a membrane, which, in some embodiments, may comprise, for example, including, but not limited to, less than or equal to, one or more or any combination of the following: 0.10M, or 0.25M, or 0.5M, or 0.75M or 1M, or 1.5M, or 2M, or 2.25M, or 2.5M, or 3M, or 4M, or 5M. For example, for some membrane based processes, it may be desirable for the concentration or osmotic pressure to be sufficiently low to enable permeation of a solution comprising acetic acid through a membrane, which, in some embodiments, may comprise, for example, an alkali or sodium concentration comprising including, but not limited to, less than or equal to, one or more or any combination of the following: 0.10M, or 0.25M, or 0.5M, or 0.75M or 1M, or 1.5M, or 2M, or 2.25M, or 2.5M, or 3M, or 4M, or 5M.<br>For example, in some embodiments, it may be desirable for the concentration of sodium + citric acid species + acetic acid species to be sufficiently high to enable or facilitate energy efficient separation of a portion of acetic acid, or acetic acid vapor, or aqueous acetic acid, or any combination thereof using, for example, distillation. In some embodiments, a solution comprising a sufficiently low pH and/or a sufficiently high concentration may possess volatile acetic acid, or a vapor pressure comprising acetic acid, or any combination thereof, which may enable the separation of a portion of a solution comprising acetic acid from a portion of a solution comprising sodium + citric acid species.<br>In some embodiments, a solution comprising sodium + acetic acid species may be transferred to '10', or '12', or any combination thereof.<br>In some embodiments, a solution comprising acetic acid may be transferred to '2'.<br>In some embodiments, a solution or solid or any combination thereof comprising sodium + citric acid species may be transferred to '21'.<br>In some embodiments, '10' and/or '12' may be integrated, or may comprise a combined step, or may comprise a simultaneous process, or may comprise a staged system, or any combination thereof. |
| 16 | In some embodiments, a chemical comprising sodium + citric acid species may be reacted with a chemical comprising calcium hydroxide, or calcium oxide, or calcium carbonate, or calcium bicarbonate, or any combination thereof to form a chemical comprising sodium hydroxide, or sodium carbonate, or sodium bicarbonate, or any combination thereof, and/or a chemical comprising calcium + citric acid species.<br>In some embodiments, a solution comprising sodium + citric acid species may be reacted with a chemical comprising calcium hydroxide, or calcium oxide, or calcium carbonate, or calcium bicarbonate, or any combination thereof to form a solution comprising sodium hydroxide, or sodium carbonate, or sodium bicarbonate, or any combination thereof, and/or a solid comprising calcium + citric acid species.<br>In some embodiments, a solution comprising sodium hydroxide, or sodium carbonate, or sodium bicarbonate, or any combination thereof may comprise a product. In some embodiments, a solution may undergo concentrating, or purification, or crystallization, or any combination thereof.<br>In some embodiments, a portion of any residual calcium citrate or citric acid species may be separated using, for example, nanofiltration, or calcium precipitation, or any combination thereof.<br>In some embodiments, a chemical comprising calcium citrate may be transferred to '21'.<br>In some embodiments, a solid comprising calcium citrate may be separated using, for example, a solid-liquid separation method. |

Example FIG. 2C Example Detailed Step-by-Step Description of an Example Embodiment with Example Parameters -continued Example FIG. 2C Example Detailed Step-by-Step Description of an Example Embodiment with Example Parameters

| Related Label | Description |
|---|---|
| 21 | In some embodiments, a chemical comprising calcium citrate may be reacted with a chemical comprising sulfur dioxide, or aqueous sulfur dioxide, or sulfurous acid, or sulfite, or bisulfite, or a sulfur dioxide derivative, or any combination thereof to form, for example, a chemical comprising calcium sulfite, or calcium bisulfite, or calcium + sulfur dioxide species, or any combination thereof and a chemical comprising citric acid.<br>In some embodiments, a solid comprising calcium citrate may be reacted with a chemical comprising sulfur dioxide, or aqueous sulfur dioxide, or sulfurous acid, or sulfite, or bisulfite, or a sulfur dioxide derivative, or any combination thereof to form, for example, a chemical comprising calcium sulfite, or calcium bisulfite, or calcium + sulfur dioxide species, or any combination thereof and a solution or solid or liquid or any combination thereof comprising citric acid.<br>In some embodiments, a chemical comprising citric acid may be transferred to '10' and/or '12'.<br>In some embodiments, a chemical comprising calcium sulfite, such as a solid comprising calcium sulfite, may be transferred to '23'.<br>In some embodiments, it may be desirable to transfer calcium sulfite under low oxygen or minimal oxygen conditions. For example, in some embodiments, it may be desirable to employ a nitrogen gas, or a nitrogen gas purge, or an inert gas, or an inert gas purge, or a positive pressure inert gas, or argon gas, or carbon dioxide gas, or any combination thereof. For example, in some embodiments, it may be desirable to employ an oxygen gas concentration in the headspace gases of less than 22%, or less than 21%, or less than the concentration of oxygen in ambient air, or less than the partial pressure of oxygen in ambient air, or less than 15% oxygen concentration, or less than 10% oxygen concentration, or less than 5% oxygen concentration, or less than 3% oxygen concentration, or less than 2% oxygen concentration, or less than 1% oxygen concentration, or any combination thereof. |
| 23 | In some embodiments, a chemical comprising calcium sulfite may be decomposed, or thermally decomposed, or reacted, or any combination thereof to form a chemical comprising calcium oxide, or calcium hydroxide, or calcium carbonate, or any combination thereof and/or a chemical comprising sulfur dioxide, or aqueous sulfur dioxide, or sulfurous acid, or sulfite, or bisulfite, or sulfur dioxide species, or any combination thereof.<br>In some embodiments, it may be desirable to react or decompose a chemical comprising calcium sulfite under conditions which may facilitate the formation of calcium oxide, or sulfur dioxide, or any combination thereof.<br>In some embodiments, it may be desirable to at least partially dry, or purify, or dehydrate, or any combination thereof a chemical comprising calcium sulfite. In some embodiments, it may be desirable to at least partially dry, or purify, or dehydrate, or any combination thereof a chemical comprising calcium sulfite, for example, prior to, or during, or any combination thereof, the decomposition of a chemical comprising calcium sulfite.<br>In some embodiments, a chemical comprising sulfur dioxide may be transferred to '21'.<br>In some embodiments, a chemical comprising calcium oxide may be transferred to '26'. |
| 26 | In some embodiments, a chemical comprising calcium oxide may be reacted with a chemical comprising water to form a chemical comprising calcium hydroxide.<br>In some embodiments, it may be desirable to recover a portion of heat from a reaction of a chemical comprising calcium oxide and a chemical comprising water.<br>In some embodiments, it may be desirable to employ a portion of calcium oxide as a dehydrating or drying agent, which may, for example, facilitate a portion of a dehydration of, for example, a portion of calcium sulfite.<br>In some embodiments, a chemical comprising calcium oxide, or calcium hydroxide, or calcium carbonate, or any combination thereof may be transferred to '16'. |

Example Definitions

Large MW Acid Species:

A Large MW Acid Species may comprise, including, but not limited to, one or more or any combination of the following:

- An acid species with a molecular weight greater than the molecular weight of a Small MW Acid Species in the same system or process
- An acid species with a molecular weight greater than the molecular weight of a Small MW Acid Species
- An acid species with a hydration radius greater than the hydration radius of a Small MW Acid Species in the same system or process
- An acid species with a hydration radius greater than the hydration radius of a Small MW Acid Species
- An acid species with a hydration radius greater than the hydration radius of a Small MW Acid Species at the same pH, or at the same concentration, or in the same solution, or any combination thereof
- An acid anion
- An acid
- Large MW Weak Acid
- Large Molecular Weight Weak Acid
- Large Molecular Weight Acid
- An acid with a molecular weight greater than 50 grams per mole

- An acid with a molecular weight greater than 75 grams per mole
- An acid with a molecular weight greater than 100 grams per mole
- An acid with a molecular weight greater than 125 grams per mole
- An acid with a molecular weight greater than 150 grams per mole
- An acid with a molecular weight greater than 175 grams per mole Small MW Acid Species:

A Small MW Acid Species, or a Low MW Acid Species, or any combination thereof may comprise, including, but not limited to, one or more or any combination of the following:

- An acid species with a molecular weight less than the molecular weight of a Large MW Acid Species in the same system or process
- An acid species with a molecular weight less than the molecular weight of a Large MW Acid Species
- An acid species with a hydration radius less than the hydration radius of a Large MW Acid Species in the same system or process
- An acid species with a hydration radius less than the hydration radius of a Large MW Acid Species
- An acid species with a hydration radius less than the hydration radius of a Large MW Acid Species at the same pH, or at the same concentration, or in the same solution, or any combination thereof
- An acid anion
- An acid
- Small MW Weak Acid
- Small Molecular Weight Weak Acid
- Small Molecular Weight Acid
- An acid with a molecular weight less than 65 grams per mole
- An acid with a molecular weight less than 75 grams per mole
- An acid with a molecular weight less than 100 grams per mole
- An acid with a molecular weight less than 125 grams per mole
- An acid with a molecular weight less than 150 grams per mole
- An acid with a molecular weight less than 175 grams per mole Non-Volatile Acid Species:

A non-volatile acid species may comprise, including, but not limited to, one or more or any combination of the following:

- A chemical which has a lesser vapor pressure than a volatile acid species in the same system.
- A chemical which has a lesser vapor pressure than a volatile acid species in the same system at the same concentration, or in the same solution, or at the same pH, or in the same solid, or any combination thereof.
- A chemical which may have a vapor pressure less than 0.001 Bar at a temperature of 150 degrees Celsius.
- A chemical which may have a vapor pressure less than 0.001 Bar at a temperature less than 125 degrees Celsius.
- A chemical which may have a vapor pressure less than 0.001 Bar at a temperature less than 100 degrees Celsius.
- A large MW acid species
- A large MW weak acid species Volatile Acid Species:

A volatile acid species may comprise, including, but not limited to, one or more or any combination of the following:

- A chemical which has a higher vapor pressure than a non-volatile acid species in the same system.
- A chemical which has a higher vapor pressure than a non-volatile acid species in the same system at the same concentration, or in the same solution, or at the same pH, or in the same solid, or any combination thereof.
- A chemical which may have a vapor pressure, or gas phase, or any combination thereof under at least some condition, such as at a certain temperature, or pressure, or pH, or concentration, or state.
- A chemical which may have a vapor pressure, or gas phase, or any combination thereof under at least some condition at a temperature less than 150 degrees Celsius.
- A chemical which may have a vapor pressure, or gas phase, or any combination thereof under at least some condition at a temperature less than 125 degrees Celsius.

A chemical which may have a vapor pressure, or gas phase, or any combination thereof under at least some condition at a temperature less than 100 degrees Celsius.

- A small MW acid species
- A small MW weak acid species

Rejectable Acid: May comprise, including, but not limited to, one or more or any combination of the following:

- An acid, or acid anion, or any combination thereof species which has a lesser permeation rate, or greater rejection rate, or any combination thereof at the same pH compared to or relative to a permeable acid.
- An acid, or acid anion, or any combination thereof species which has a lower permeation rate, or greater rejection rate, or any combination thereof compared to or relative to a permeable acid, which may be in the same solution.
- An acid which may be at least partially rejected by a semi-permeable membrane when at an ionic state, or a non-ionic state, or any combination thereof.
- An acid which may be at least partially rejected by a semi-permeable membrane when at a non-ionic state.

Permeable Acid: May comprise, including, but not limited to, one or more or any combination of the following:

- An acid, or acid anion, or any combination thereof species which has a greater permeation rate, or lesser rejection rate, or any combination thereof at the same pH compared to or relative to a rejectable acid.
- An acid, or acid anion, or any combination thereof species which has a greater permeation rate, or lesser rejection rate, or any combination thereof compared to or relative to a rejectable acid, which may be in the same solution.
- An acid which may least partially permeate to a semi-permeable membrane when at an ionic state, or a non-ionic state, or any combination thereof.
- An acid which may be at least partially permeate a semi-permeable membrane when at a non-ionic state.

High Concentration Definition: High concentration of a component may be defined as a volume percent or weight percent concentration greater than or equal to one or more or any combination of the following: 0.001%, or 0.01%, or 0.1%, or 1%, or 5%, or 10%, or 15%, or 20%, or 25%, or 30%, or 35%, or 40%, or 45%, or 50%, or 55%, or 60%, or 65%, or 70%, or 75%, or 80%, or 85%, or 90%, or 95%, or 96%, or 97%, or 98%, or 99%, or 99.5%, or 99.9%, or 99.99%, or 99.999%.

High Purity Definition: High purity of a component may be defined as a volume percent or weight percent concentration which may be greater than or equal to one or more or any combination of the following: 0.001%, or 0.01%, or 0.1%, or 1%, or 5%, or 10%, or 15%, or 20%, or 30%, or 40%, or 50%, or 55%, or 60%, or 65%, or 70%, or 75%, or 80%, or 85%, or 90%, or 95%, or 96%, or 97%, or 98%, or 99%, or 99.5%, or 99.9%, or 99.99%, or 99.999%.

Example Conditions, Concentrations, Compositions, Parameters, Systems, Methods, and Equipment of Some Embodiments

- Rejection rate of a dissolved species, or an aqueous species, or any combination thereof may be greater than, or less than, or equal to, including, but not limited to, one, or more, or any combination of the following: 0.0001%, or 0.001%, or 0.01%, or 0.1%, or 0.5%, or 1%, or 2%, or 3%, or 4%, or 5%, or 6%, or 7%, or 8%, or 9%, or 10%, or 11%, or 12%, or 13%, or 14%, or 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 61%, or 62%, or 63%, or 64%, or 65%, or 66%, or 67%, or 68%, or 69%, or 70%, or 71%, or 72%, or 73%, or 74%, or 75%, or 76%, or 77%, or 78%, or 79%, or 80%, or 81%, or 82%, or 83%, or 84%, or 85%, or 86%, or 87%, or 88%, or 89%, or 90%, or 91%, or 92%, or 93%, or 94%, or 95%, or 96%, or 97%, or 98%, or 99%, or 99.5%, or 99.9%, or 99.99%, or 99.999%.
- Permeation rate of a dissolved species, or an aqueous species, or any combination thereof may be greater than, or less than, or equal to, including, but not limited to, one, or more, or any combination of the following: 0.0001%, or 0.001%, or 0.01%, or 0.1%, or 0.5%, or 1%, or 2%, or 3%, or 4%, or 5%, or 6%, or 7%, or 8%, or 9%, or 10%, or 11%, or 12%, or 13%, or 14%, or 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 61%, or 62%, or 63%, or 64%, or 65%, or 66%, or 67%, or 68%, or 69%, or 70%, or 71%, or 72%, or 73%, or 74%, or 75%, or 76%, or 77%, or 78%, or 79%, or 80%, or 81%, or 82%, or 83%, or 84%, or 85%, or 86%, or 87%, or 88%, or 89%, or 90%, or 91%, or 92%, or 93%, or 94%, or 95%, or 96%, or 97%, or 98%, or 99%, or 99.5%, or 99.9%, or 99.99%, or 99.999%.
- Some embodiments may employ at least a portion of energy recovery, or power recovery, or recovery, or chemical recovery, or any combination thereof.
- Some embodiments may employ at least a portion of energy recovery, or power recovery, or recovery, or chemical recovery, or any combination thereof. For example, in some embodiments, at least a portion of energy or power may be recovered from pressure, or excess pressure, or any combination thereof. For example, in some embodiments, at least a portion of energy or power may be recovered from the pressure of a retentate solution, using, for example, including, but not limited to, one or more or any combination of the following: a pressure exchanger, or a PX pressure exchanger, or a turbocharger pressure exchanger, or a continuous pressure exchanger, or a batch pressure exchanger, or other pressure exchanging mechanism, or other power recovery mechanism, or other energy recovery mechanism, or any combination thereof. For example, in some embodiments, at least a portion of energy or power may be recovered from the pressure which may be generated or released from the depressurization of a solution comprising dissolved gas, such as, for example, dissolved acid gas, such as, for example, dissolved carbon dioxide. For example, in some embodiments, a portion of power or energy may be generated, or transferred, or exchanged, using, for example, including, but not limited to, one or more or any combination of the following: a turbocharger, or a pneumatic turbine, or a gas turbine, or pneumatic generator, or an expansion turbine, or other energy recovery mechanism, or other power recovery mechanism, or any combination thereof.
- In some embodiments, a solution comprising sodium+ carbon dioxide species may comprise sodium bicarbonate, or sodium carbonate, or sodium sesquicarbonate, or free carbon dioxide, or sodium acetate, or sodium sulfate, or sulfate, or calcium, or any combination thereof. In some embodiments, the molar ratio of sodium: carbon may be greater than or equal to, including, but not limited to, one or more or any combination of the following: 1:0.001, or 1:0.01, or 1:0.1, or 1:0.2, or 1:0.3, or 1:0.4, or 1:0.5, or 1:0.6, or 1:0.7, or 1:0.8, or 1:0.9, or 1:1, or 1:1.1, or 1:1.2, or 1:1.3, or 1:1.4, or 1:1.5, or 1:1.75, or 1:2, or 1:2.5, or 1:3, or 1:3.5, or 1:4, or 1:4.5, or 1:5, or 1:7, 5, or 1:10, or 1:15, or 1:20, or 1:30, or 1:40, or 1:50, or 1:60, or 1:70, or 1:80, or 1:90, or 1:100, or 1:125, or 1:150, or 1:200, or 1:250, or 1:300, or 1:400, or 1:500, or 1:750, or 1:1,000, or 1:1,500, or 1:2,000, or 1:10,000.
- In some embodiments, a solution comprising sodium+ large molecular weight acid species may comprise a molar ratio of sodium: large molecular weight species which may be greater than or equal to, including, but not limited to, one or more or any combination of the following: 1:0.001, or 1:0.01, or 1:0.1, or 1:0.2, or 1:0.3, or 1:0.4, or 1:0.5, or 1:0.6, or 1:0.7, or 1:0.8, or 1:0.9, or 1:1, or 1:1.1, or 1:1.2, or 1:1.3, or 1:1.4, or 1:1.5, or 1:1.75, or 1:2, or 1:2.5, or 1:3, or 1:3.5, or 1:4, or 1:4.5, or 1:5, or 1:7, 5, or 1:10, or 1:15, or 1:20, or 1:30, or 1:40, or 1:50, or 1:60, or 1:70, or 1:80, or 1:90, or 1:100, or 1:125, or 1:150, or 1:200, or 1:250, or 1:300, or 1:400, or 1:500, or 1:750, or 1:1,000, or 1:1,500, or 1:2,000, or 1:10,000.
- In some embodiments, a solution comprising sodium+ small molecular weight acid species may comprise a molar ratio of sodium: small molecular weight weak acid species which may be greater than or equal to, including, but not limited to, one or more or any combination of the following: 1:0.001, or 1:0.01, or 1:0.1, or 1:0.2, or 1:0.3, or 1:0, 4, or 1:0.5, or 1:0.6, or 1:0.7, or 1:0.8, or 1:0.9, or 1:1, or 1:1.1, or 1:1.2, or 1:1, 3, or 1:1.4, or 1:1.5, or 1:1.75, or 1:2, or 1:2.5, or 1:3, or 1:3.5, or 1:4, or 1:4, 5, or 1:5, or 1:7.5, or 1:10, or 1:15, or 1:20, or 1:30, or 1:40, or 1:50, or 1:60, or 1:70, or 1:80, or 1:90, or 1:100, or 1:125, or 1:150, or 1:200, or 1:250, or 1:300, or 1:400, or 1:500, or 1:750, or 1:1,000, or 1:1,500, or 1:2,000, or 1:10,000.
- Sodium may be provided as an example alkali. Other alkalis or alkali-like cations may be employed instead of, or in addition to, for example, sodium. For example, other alkalis may include, but may be not limited to, one or more or any combination of the following: lithium (Li), or sodium (Na), or potassium (K), or rubidium (Rb), or cesium (Cs), or ammonia, or ammonium, or ammonia ($NH_3$), or ammonium ($NH_4$), or amine, or ammonia-derivative, or nitrogenous cation.

Calcium, or magnesium, or any combination thereof may be provided as an example alkaline-earth. Other alkaline-earths or alkaline-earth-like cations may be employed instead of, or in addition to, for example, calcium, or magnesium, or any combination thereof. For example, other alkaline-earths cations may include, but may be not limited to, one or more or any combination of the following: beryllium (Be), magnesium (Mg), calcium (Ca), strontium (Sr), barium (Ba), and radium (Ra), or amine, or ammonia-derivative, or nitrogenous cation. In some embodiments, an alkaline-earth may include metals or metal ions which may have similar properties to alkaline earth group metals, such as in terms of valency and/or certain reaction contexts, such as zinc, or iron, or manganese, or lead, or copper, or aluminum, or transition metal group metals, and other metals or metal ions. In some embodiments, an alkaline-earth may include metals or metal ions which may have similar properties to alkaline earth group metals, such as in terms of valency and/or certain reaction contexts, such as zinc, or iron, or manganese, or lead, or copper, or aluminum, or transition metal group metals, and other metals or metal ions, or any combination thereof, and/or may comprise an alkaline earth or alkaline earth-like chemical in one or more or any combination of reactions, or reaction steps, or process steps, or systems, or methods, or any combination thereof described herein. For example, zinc cation may have a charge of 2+ may be employed instead of or in addition to calcium, or magnesium, or any combination thereof and/or may comprise an alkaline earth or alkaline earth-like chemical or ion or species. For example, zinc cation has a charge of 2+ may be employed instead of or in addition to calcium, or magnesium, or any combination thereof and/or may comprise an alkaline earth or alkaline earth-like chemical in one or more or any combination of reactions, or reaction steps, or process steps, or systems, or methods, or any combination thereof described herein.

In some embodiments, a low molecular weight weak acid or a small molecular weight acid or small molecular weight acid may be defined as having a molecular weight, or hydration radius, or any combination thereof less than a large molecular weight acid or large molecular weight acid in the same process or system. In some embodiments, a low molecular weight acid or a small molecular weight acid may be defined as having a molecular weight, or hydration radius, or any combination thereof less than a large molecular weight acid or large molecular weight weak acid, which may, for example, be in the same system or process.

In some embodiments, citric acid or citrate may be provided as an example large molecular weight acid, or large MW acid, or large molecular weight weak acid, or large molecular weight acid, or retained acid, or rejected acid, or rejectable weak acid, or rejected acid species, or retained acid species, or carboxylic acid, or acid, or an acid with a vapor pressure less than water, or an acid with a vapor pressure less than carbon dioxide, or an acid with a boiling point greater than water, or an acid with a boiling point greater than carbon dioxide, a weak acid with a vapor pressure less than water, or an weak acid with a vapor pressure less than carbon dioxide, or a weak acid with a boiling point greater than water, or a weak acid with a boiling point greater than carbon dioxide, or any combination thereof. In some embodiments, citric acid or citrate may be provided as an example carboxylic acid, or acid, or acid stronger than carbonic acid and weaker than sulfurous acid, or any combination thereof. Other carboxylic acids, or acids, or acids stronger than carbonic acid and weaker than sulfurous acid, or any combination thereof may be employed instead of, or in addition to, for example, citric acid. In some embodiments, large MW acids, or carboxylic acids, or any combination thereof may be employed and may include, but are not limited to, one or more or any combination of the following: citric acid, or ascorbic acid, or Palmitic Acid, or Stearic Acid, or Arachidic Acid, or Oleic Acid, or Linoleic Acid, or Linolenic Acid, or Phthalic Acid, or Terephthalic Acid, or Isophthalic Acid, or Adipic Acid, or Sebacic Acid, or Azelaic Acid, or Citric Acid, or Malic Acid, or unsaturated monocarboxylic acids, or acrylic acid, or fatty acids, or amino acids, or keto acids, or carbonaceous acids, or nitrogenous acids, or phosphorus acids, or a non-volatile acid stronger than carbonic acid and weaker than sulfurous acid, or a non-volatile acid stronger than carbonic acid and weaker than aqueous sulfur dioxide, or a non-volatile acid stronger than carbonic acid and weaker than strong acids, keto acids, or aromatic carboxylic acids, or dicarboxylic acids, or tricarboxylic acids, or alpha hydroxy acids, or beta hydroxy acids, or omega hydroxy acids, or divinyl ether fatty acids, or or acid with a vapor pressure less than a small MW acid, or non-volatile acid, or low vapor pressure acid, or acid with a vapor pressure low than that of water, or acid with a boiling point temperature higher than water, or organic acid with a boiling point temperature higher than water, or organic acid with a boiling point temperature similar to water, or citric acid, or malic acid, Tartaric Acid, or Fumaric acid, or Adipic Acid, or Benzoic Acid, or Succinic Acid, or oxalic acid, or Lactic acid, or glycolic acid, or Glyceric acid, or gluconic acid, or glyoxylic acid, or butyric acid, or Valeric acid, or ascorbic acid, or Isocyanic acid, or C1 acids, or C2 acids, or C3 acids, or C4 acids, or C5 acids, or C6 acids, or C7 acids, or C8 acids, or C9 acids, or C10 acids, or an acid with a vapor pressure less than water, or an acid with a vapor pressure less than carbon dioxide, or an acid with a boiling point greater than water, or an acid with a boiling point greater than carbon dioxide, a weak acid with a vapor pressure less than water, or an weak acid with a vapor pressure less than carbon dioxide, or a weak acid with a boiling point greater than water, or a weak acid with a boiling point greater than carbon dioxide, or carboxylic acids known in the art, or acids known in the art.

In some embodiments, acetic acid or acetate may be provided as an example small molecular weight acid, or small molecular weight weak acid, or small MW acid, or low molecular weight acid, or low molecular weight weak acid, or permeable weak acid, or permeable acid, or permeable acid species, or carboxylic acid, or acid, or an acid with a vapor pressure less than water, or an acid with a vapor pressure less than carbon dioxide, or an acid with a boiling point greater than water, or an acid with a boiling point greater than carbon dioxide, a weak acid with a vapor pressure less than water, or an weak acid with a vapor pressure less than carbon dioxide, or a weak acid with a boiling point greater than water, or a weak acid with a boiling point greater than carbon dioxide, or any combination thereof. In some embodiments, acetic acid or acetate may be provided as an example carboxylic acid, or acid, or acid stronger than carbonic acid and weaker than sulfurous acid, or any combination thereof. Other carboxylic acids, or acids, or acids stronger than carbonic acid and weaker than sulfurous acid, or any combination thereof may be employed instead of, or in addition to, for example, acetic acid. In some embodiments, acids, or carboxylic acids, or any combination thereof may be employed and may include, but are not limited to, one or more or any combination of the following: formic acid, or acetic acid, or propanoic acid, or volatile acid, or non-volatile acid, or low vapor pressure acid, or acid with a vapor pressure low than that of water, or acid with a boiling point temperature higher than water, or organic acid with a boiling point temperature higher than water, or organic acid with a boiling point temperature similar to water, or citric acid, or malic acid, Tartaric Acid, or Fumaric acid, or Adipic Acid, or Benzoic Acid, or Succinic Acid, or oxalic acid, or Lactic acid, or glycolic acid, or Glyceric acid, or gluconic acid, or glyoxylic acid, or butyric acid, or Valeric acid, or Isocyanic acid, or C1 acids, or C2 acids, or C3 acids, or C4 acids, or C5 acids, or C6 acids, or C7 acids, or C8 acids, or C9 acids, or C10 acids, or an acid with a vapor pressure less than water, or an acid with a vapor pressure less than carbon dioxide, or an acid with a boiling point greater than water, or an acid with a boiling point greater than carbon dioxide, a weak acid with a vapor pressure less than water, or an weak acid with a vapor pressure less than carbon dioxide, or a weak acid with a boiling point greater than water, or a weak acid with a boiling point greater than carbon dioxide, or carboxylic acids known in the art, or acids known in the art.

Carbonate or bicarbonate or carbonic acid or carbon dioxide may be provided as an example of an acid, or acid gas, or acid gas species. Other acids, or acids weaker than some carboxylic acids, or acid gases, or any combination thereof may be employed instead of, or in addition to, carbonate or bicarbonate or carbonic acid or carbon dioxide. Other acids, or acids weaker than some carboxylic acids, or acid gases, or any combination thereof or any combination thereof may include, but may be not limited to, one or more or any combination of the following: silicates, or silicon derivatives, or iron derivatives, or transition metal derivatives, or metal derivative anions, or ferrites, or ferrates, or aluminates, or silicates, or oxide anions, or sulfides, or hydrogen sulfide, or nitrites.

In some embodiments, the concentration of a chemical, or a solute, or a dissolved gas, or any combination thereof, in a solution may be less than, or equal to, or greater than, including, but not limited to, one or more or any combination of the following: 0.01 g/L, or 0.05 g/L, or 0.1 g/L, or 0.25 g/L, or 0.5 g/L, or 0.75 g/L, or 1 g/L, or 2 g/L, or 3 g/L, or 4 g/L, or 5 g/L, or 10 g/L, or 15 g/L, or 20 g/L, or 25 g/L, or 30 g/L, or 35 g/L, or 40 g/L, or 45 g/L, or 50 g/L, or 55 g/L, or 60 g/L, or 65 g/L, or 70 g/L, or 75 g/L, or 80 g/L, or 85 g/L, or 90 g/L, or 95 g/L, or 100 g/L, or 105 g/L, or 110 g/L, or 115 g/L, or 120 g/L, or 125 g/L, or 130 g/L, or 135 g/L, or 140 g/L, or 145 g/L, or 150 g/L, or 155 g/L, or 160 g/L, or 165 g/L, or 170 g/L, or 175 g/L, or 180 g/L, or 185 g/L, or 190 g/L, or 195 g/L, or 200 g/L, or 205 g/L, or 210 g/L, or 215 g/L, or 220 g/L, or 225 g/L, or 230 g/L, or 235 g/L, or 240 g/L, or 245 g/L, or 250 g/L, or 255 g/L, or 260 g/L, or 265 g/L, or 270 g/L, or 275 g/L, or 280 g/L, or 285 g/L, or 290 g/L, or 295 g/L, or 300 g/L, or 305 g/L, or 310 g/L, or 315 g/L, or 320 g/L, or 325 g/L, or 330 g/L, or 335 g/L, or 340 g/L, or 345 g/L, or 350 g/L, or 355 g/L, or 360 g/L, or 365 g/L, or 370 g/L, or 375 g/L, or 380 g/L, or 385 g/L, or 390 g/L, or 395 g/L, or 400 g/L, or 405 g/L, or 410 g/L, or 415 g/L, or 420 g/L, or 425 g/L, or 430 g/L, or 435 g/L, or 440 g/L, or 445 g/L, or 450 g/L, or 455 g/L, or 460 g/L, or 465 g/L, or 470 g/L, or 475 g/L, or 480 g/L, or 485 g/L, or 490 g/L, or 495 g/L, or 500 g/L, or 505 g/L, or 510 g/L, or 515 g/L, or 520 g/L, or 525 g/L, or 530 g/L, or 535 g/L, or 540 g/L, or 545 g/L, or 550 g/L, or 555 g/L, or 560 g/L, or 565 g/L, or 570 g/L, or 575 g/L, or 580 g/L, or 585 g/L, or 590 g/L, or 595 g/L, or 600 g/L, or 605 g/L, or 610 g/L, or 615 g/L, or 620 g/L, or 625 g/L, or 630 g/L, or 635 g/L, or 640 g/L, or 645 g/L, or 650 g/L, or 655 g/L, or 660 g/L, or 665 g/L, or 670 g/L, or 675 g/L, or 680 g/L, or 685 g/L, or 690 g/L, or 695 g/L, or 700 g/L, or 705 g/L, or 710 g/L, or 715 g/L, or 720 g/L, or 725 g/L, or 730 g/L, or 735 g/L, or 740 g/L, or 745 g/L, or 750 g/L, or 755 g/L, or 760 g/L, or 765 g/L, or 770 g/L, or 775 g/L, or 780 g/L, or 785 g/L, or 790 g/L, or 795 g/L, or 800 g/L, or 805 g/L, or 810 g/L, or 815 g/L, or 820 g/L, or 825 g/L, or 830 g/L, or 835 g/L, or 840 g/L, or 845 g/L, or 850 g/L, or 855 g/L, or 860 g/L, or 865 g/L, or 870 g/L, or 875 g/L, or 880 g/L, or 885 g/L, or 890 g/L, or 895 g/L, or 900 g/L, or 905 g/L, or 910 g/L, or 915 g/L, or 920 g/L, or 925 g/L, or 930 g/L, or 935 g/L, or 940 g/L, or 945 g/L, or 950 g/L, or 955 g/L, or 960 g/L, or 965 g/L, or 970 g/L, or 975 g/L, or 980 g/L, or 985 g/L, or 990 g/L, or 995 g/L, or 1000 g/L In some embodiments, the concentration of a chemical, or a solute or a dissolved gas, or any combination thereof in a solution may be less than, or equal to, or greater than, including, but not limited to, one or more or any combination of the following: 0.0001 g/1000 g water, or 0.001 g/1000 g water, or 0.01 g/1000 g water, or 0.05 g/1000 g water, or 0.10 g/1000 g water, or 0.20 g/1000 g water, or 0.50 g/1000 g water, or 0.75 g/1000 g water, or 1 g/1000 g water, or 2 g/1000 g water, or 3 g/1000 g water, or 4 g/1000 g water, or 5 g/1000 g water, 6 g/1000 g water, or 7 g/1000 g water, or 8 g/1000 g water, or 9 g/1000 g water, or 10 g/1000 g water, or 20 g/1000 g water, or 30 g/1000 g water, or 40 g/1000 g water, or 50 g/1000 g water, or 60 g/1000 g water, or 70 g/1000 g water, or 80 g/1000 g water, or 90 g/1000 g water, or 100 g/1000 g water, or 110 g/1000 g water, or 120 g/1000 g water, or 130 g/1000 g water, or 140 g/1000 g water, or 150 g/1000 g water, or 160 g/1000 g water, or 170 g/1000 g water, or 180 g/1000 g water, or 190 g/1000 g water, or 200 g/1000 g water, or 210 g/1000 g water, or 220 g/1000 g water, or 230 g/1000 g water, or 240 g/1000 g water, or 250 g/1000 g water, or 260 g/1000 g water, or 270 g/1000 g water, or 280 g/1000 g water, or 290 g/1000 g water, or 300 g/1000 g water, or 310 g/1000 g water, or 320 g/1000 g water, or 330 g/1000 g water, or 340 g/1000 g water, or 350 g/1000 g water, or 360 g/1000 g water, or 370 g/1000 g water, or 380 g/1000 g water, or 390 g/1000 g water, or 400 g/1000 g water, or 410 g/1000 g water, or 420 g/1000 g water, or 430 g/1000 g water, or 440 g/1000 g water, or 450 g/1000 g water, or 460 g/1000 g water, or 470 g/1000 g water, or 480 g/1000 g water, or 490 g/1000 g water, or 500 g/1000 g water, or 510 g/1000 g water, or 520 g/1000 g water, or 530 g/1000 g water, or 540 g/1000 g water, or 550 g/1000 g water, or 560 g/1000 g water, or 570 g/1000 g water, or 580 g/1000 g water, or 590 g/1000 g water, or 600 g/1000 g water, or 610 g/1000 g water, or 620 g/1000 g water, or 630 g/1000 g water, or 640 g/1000 g water, or 650 g/1000 g water, or 660 g/1000 g water, or 670 g/1000 g water, or 680 g/1000 g water, or 690 g/1000 g water, or 700 g/1000 g water, or 710 g/1000 g water, or 720 g/1000 g water, or 730 g/1000 g water, or 740 g/1000 g water, or 750 g/1000 g water, or 760 g/1000 g water, or 770 g/1000 g water, or 780 g/1000 g water, or 790 g/1000 g water, or 800 g/1000 g water, or 810 g/1000 g water, or 820 g/1000 g water, or 830 g/1000 g water, or 840 g/1000 g water, or 850 g/1000 g water, or 860 g/1000 g water, or 870 g/1000 g water, or 880 g/1000 g water, or 890 g/1000 g water, or 900 g/1000 g water, or 910 g/1000 g water, or 920 g/1000 g water, or 930 g/1000 g water, or 940 g/1000 g water, or 950 g/1000 g water, or 960 g/1000 g water, or 970 g/1000 g water, or 980 g/1000 g water, or 990 g/1000 g water, or 1000 g/1000 g water, or 1,250 g/1000 g water, or 1,500 g/1000 g water, or 2,000 g/1000 g water, or 2,500 g/1000 g water, or 3,000 g/1000 g water.

In some embodiments, a pressure, or a partial pressure, or any combination thereof may be greater than or equal to one or more or any combination of the following: 1 Bar, or 5 Bar, or 10 Bar, or 15 Bar, or 20 Bar, or 25 Bar, or 30 Bar, or 40 Bar, or 50 Bar, or 60 Bar, or 70 Bar, or 80 Bar, or 90 Bar, or 100 Bar, or 110 Bar, or 120 Bar, or 130 Bar, or 140 Bar, or 150 Bar, or 175 Bar, or 200 Bar, or 225 Bar, or 250 Bar, 300 Bar, or 350 Bar, or 400 Bar, or 450 Bar, or 500 Bar, or 600 Bar, or 700 Bar, or 800 Bar, or 900 Bar, or 1,000 Bar, or 1,500 Bar, or 2,000 Bar.

In some embodiments, a temperature may be, including, but not limited to, for example, less than, or equal to, or greater than one or more or any combination of the following: −100 degrees Celsius, or −90 degrees Celsius, or −80 degrees Celsius, or −70 degrees Celsius, or −60 degrees Celsius, or −50 degrees Celsius, or −40 degrees Celsius, or −30 degrees Celsius, or −20 degrees Celsius, or −18 degrees Celsius, or −16 degrees Celsius, or −14 degrees Celsius, or −12 degrees Celsius, or −10 degrees Celsius, or −8 degrees Celsius, or −6 degrees Celsius, or −4 degrees Celsius, or −2 degrees Celsius, or 0 degrees Celsius, or 2 degrees Celsius, or 4 degrees Celsius, or 6 degrees Celsius, or 8 degrees Celsius, or 10 degrees Celsius, or 12 degrees Celsius, or 14 degrees Celsius, or 16 degrees Celsius, or 18 degrees Celsius, or 20 degrees Celsius, or 22 degrees Celsius, or 24 degrees Celsius, or 26 degrees Celsius, or 28 degrees Celsius, or 30 degrees Celsius, or 32 degrees Celsius, or 34 degrees Celsius, or 36 degrees Celsius, or 38 degrees Celsius, or 40 degrees Celsius, or 42 degrees Celsius, or 44 degrees Celsius, or 46 degrees Celsius, or 48 degrees Celsius, or 50 degrees Celsius, or 52 degrees Celsius, or 54 degrees Celsius, or 56 degrees Celsius, or 58 degrees Celsius, or 60 degrees Celsius, or 62 degrees Celsius, or 64 degrees Celsius, or 66 degrees Celsius, or 68 degrees Celsius, or 70 degrees Celsius, or 72 degrees Celsius, or 74 degrees Celsius, or 76 degrees Celsius, or 78 degrees Celsius, or 80 degrees Celsius, or 82 degrees Celsius, or 84 degrees Celsius, or 86 degrees Celsius, or 88 degrees Celsius, or 90 degrees Celsius, or 92 degrees Celsius, or 94 degrees Celsius, or 96 degrees Celsius, or 98 degrees Celsius, or 100 degrees Celsius, or 102 degrees Celsius, or 104 degrees Celsius, or 106 degrees Celsius, or 108 degrees Celsius, or 110 degrees Celsius, or 112 degrees Celsius, or 114 degrees Celsius, or 116 degrees Celsius, or 118 degrees Celsius, or 120 degrees Celsius, or 122 degrees Celsius, or 124 degrees Celsius, or 126 degrees Celsius, or 128 degrees Celsius, or 130 degrees Celsius, or 132 degrees Celsius, or 134 degrees Celsius, or 136 degrees Celsius, or 138 degrees Celsius, or 140 degrees Celsius, or 142 degrees Celsius, or 144 degrees Celsius, or 146 degrees Celsius, or 148 degrees Celsius, or 150 degrees Celsius, or 160 degrees Celsius, or 170 degrees Celsius, or 180 degrees Celsius, or 190 degrees Celsius, or 200 degrees Celsius, or 210 degrees Celsius, or 220 degrees Celsius, or 230 degrees Celsius, or 240 degrees Celsius, or 250 degrees Celsius, or 260 degrees Celsius, or 270 degrees Celsius, or 280 degrees Celsius, or 290 degrees Celsius, or 300 degrees Celsius, or 310 degrees Celsius, or 320 degrees Celsius, or 330 degrees Celsius, or 340 degrees Celsius, or 350 degrees Celsius, or 360 degrees Celsius, or 370 degrees Celsius, or 380 degrees Celsius, or 390 degrees Celsius, or 400 degrees Celsius, or 410 degrees Celsius, or 420 degrees Celsius, or 430 degrees Celsius, or 440 degrees Celsius, or 450 degrees Celsius, or 460 degrees Celsius, or 470 degrees Celsius, or 480 degrees Celsius, or 490 degrees Celsius, or 500 degrees Celsius, or 510 degrees Celsius, or 520 degrees Celsius, or 530 degrees Celsius, or 540 degrees Celsius, or 550 degrees Celsius, or 560 degrees Celsius, or 570 degrees Celsius, or 580 degrees Celsius, or 590 degrees Celsius, or 600 degrees Celsius, or 610 degrees Celsius, or 620 degrees Celsius, or 630 degrees Celsius, or 640 degrees Celsius, or 650 degrees Celsius, or 660 degrees Celsius, or 670 degrees Celsius, or 680 degrees Celsius, or 690 degrees Celsius, or 700 degrees Celsius, or 710 degrees Celsius, or 720 degrees Celsius, or 730 degrees Celsius, or 740 degrees Celsius, or 750 degrees Celsius, or 760 degrees Celsius, or 770 degrees Celsius, or 780 degrees Celsius, or 790 degrees Celsius, or 800 degrees Celsius, or 810 degrees Celsius, or 820 degrees Celsius, or 830 degrees Celsius, or 840 degrees Celsius, or 850 degrees Celsius, or 860 degrees Celsius, or 870 degrees Celsius, or 880 degrees Celsius, or 890 degrees Celsius, or 900 degrees Celsius, or 910 degrees Celsius, or 920 degrees Celsius, or 930 degrees Celsius, or 940 degrees Celsius, or 950 degrees Celsius, or 960 degrees Celsius, or 970 degrees Celsius, or 980 degrees Celsius, or 990 degrees Celsius, or 1000 degrees Celsius, or 1010 degrees Celsius, or 1020 degrees Celsius, or 1030 degrees Celsius, or 1040 degrees Celsius, or 1050 degrees Celsius, or 1060 degrees Celsius, or 1070 degrees Celsius, or 1080 degrees Celsius, or 1090 degrees Celsius, or 1100 degrees Celsius, or 1110 degrees Celsius, or 1120 degrees Celsius, or 1130 degrees Celsius, or 1140 degrees Celsius, or 1150 degrees Celsius, or 1160 degrees Celsius, or 1170 degrees Celsius, or 1180 degrees Celsius, or 1190 degrees Celsius, or 1200 degrees Celsius, or 1210 degrees Celsius, or 1220 degrees Celsius, or 1230 degrees Celsius, or 1240 degrees Celsius, or 1250 degrees Celsius, or 1260 degrees Celsius, or 1270 degrees Celsius, or 1280 degrees Celsius, or 1290 degrees Celsius, or 1300 degrees Celsius, or 1310 degrees Celsius, or 1320 degrees Celsius, or 1330 degrees Celsius, or 1340 degrees Celsius, or 1350 degrees Celsius, or 1360 degrees Celsius, or 1370 degrees Celsius, or 1380 degrees Celsius, or 1390 degrees Celsius, or 1400 degrees Celsius, or 1410 degrees Celsius, or 1420 degrees Celsius, or 1430 degrees Celsius, or 1440 degrees Celsius, or 1450 degrees Celsius, or 1460 degrees Celsius, or 1470 degrees Celsius, or 1480 degrees Celsius, or 1490 degrees Celsius, or 1500 degrees Celsius, or 1600 degrees Celsius, or 1700 degrees Celsius, or 1800 degrees Celsius, or 1900 degrees Celsius, or 2000 degrees Celsius, or 2250 degrees Celsius, or 2500 degrees Celsius, or 2750 degrees Celsius, or 3000 degrees Celsius, or 4000 degrees Celsius, or 5000 degrees Celsius, or 6000 degrees Celsius, or 7000 degrees Celsius.

In some embodiments, a pH may be, including, but not limited to, for example, less than, or equal to, or greater than one or more or any combination of the following: pH of 0.1, or pH of 0.2, or pH of 0.3, or pH of 0.4, or pH of 0.5, or pH of 0.6, or pH of 0.7, or pH of 0.8, or pH of 0.9, or pH of 1.0, or pH of 1.1, or pH of 1.2, or pH of 1.3, or pH of 1.4, or pH of 1.5, or pH of 1.6, or pH of 1.7, or pH of 1.8, or pH of 1.9, or pH of 2.0, or pH of 2.1, or pH of 2.2, or pH of 2.3, or pH of 2.4, or pH of 2.5, or pH of 2.6, or pH of 2.7, or pH of 2.8, or pH of 2.9, or pH of 3.0, or pH of 3.1, or pH of 3.2, or pH of 3.3, or pH of 3.4, or pH of 3.5, or pH of 3.6, or pH of 3.7, or pH of 3.8, or pH of 3.9, or pH of 4.0, or pH of 4.1, or pH of 4.2, or pH of 4.3, or pH of 4.4, or pH of 4.5, or pH of 4.6, or pH of 4.7, or pH of 4.8, or pH of 4.9, or pH of 5.0, or pH of 5.1, or pH of 5.2, or pH of 5.3, or pH of 5.4, or pH of 5.5, or pH of 5.6, or pH of 5.7, or pH of 5.8, or pH of 5.9, or pH of 6.0, or pH of 6.1, or pH of 6.2, or pH of 6.3, or pH of 6.4, or pH of 6.5, or pH of 6.6, or pH of 6.7, or pH of 6.8, or pH of 6.9, or pH of 7.0, or pH of 7.1, or pH of 7.2, or pH of 7.3, or pH of 7.4, or pH of 7.5, or pH of 7.6, or pH of 7.7, or pH of 7.8, or pH of 7.9, or pH of 8.0, or pH of 8.1, or pH of 8.2, or pH of 8.3, or pH of 8.4, or pH of 8.5, or pH of 8.6, or pH of 8.7, or pH of 8.8, or pH of 8.9, or pH of 9.0, or pH of 9.1, or pH of 9.2, or pH of 9.3, or pH of 9.4, or pH of 9.5, or pH of 9.6, or pH of 9.7, or pH of 9.8, or pH of 9.9, or pH of 10.0, or pH of 10.1, or pH of 10.2, or pH of 10.3, or pH of 10.4, or pH of 10.5, or pH of 10.6, or pH of 10.7, or pH of 10.8, or pH of 10.9, or pH of 11.0, or pH of 11.1, or pH of 11.2, or pH of 11.3, or pH of 11.4, or pH of 11.5, or pH of 11.6, or pH of 11.7, or pH of 11.8, or pH of 11.9, or pH of 12.0, or pH of 12.1, or pH of 12.2, or pH of 12.3, or pH of 12.4, or pH of 12.5, or pH of 12.6, or pH of 12.7, or pH of 12.8, or pH of 12.9, or pH of 13.0, or pH of 13.1, or pH of 13.2, or pH of 13.3, or pH of 13.4, or pH of 13.5, or pH of 13.6, or pH of 13.7, or pH of 13.8, or pH of 13.9, or pH of 14.0, or pH of 14.1, or pH of 14.2, or pH of 14.3, or pH of 14.4, or pH of 14.5, or pH of 14.6, or pH of 14.7, or pH of 14.8, or pH of 14.9, or pH of 15.0

In some embodiments, a concentration, or molar concentration, or any combination thereof may be, including, but not limited to, for example, less than, or equal to, or greater than one or more or any combination of the following: 0.000001M, or 0.00001M, or 0.0001M, or 0.0005M, or 0.001M, or 0.005M, or 0.01M, or 0.015M, or 0.02M, or 0.025M, or 0.03M, or 0.035M, or 0.04M, or 0.045M, or 0.05M, or 0.055M, or 0.06M, or 0.065M, or 0.07M, or 0.075M, or 0.08M, or 0.085M, or 0.09M, or 0.095M, or 0.1M, or 0.105M, or 0.11M, or 0.115M, or 0.12M, or 0.125M, or 0.13M, or 0.135M, or 0.14M, or 0.145M, or 0.15M, or 0.155M, or 0.16M, or 0.165M, or 0.17M, or 0.175M, or 0.18M, or 0.185M, or 0.19M, or 0.195M, or 0.2M, or 0.205M, or 0.21M, or 0.215M, or 0.22M, or 0.225M, or 0.23M, or 0.235M, or 0.24M, or 0.245M, or 0.25M, or 0.255M, or 0.26M, or 0.265M, or 0.27M, or 0.275M, or 0.28M, or 0.285M, or 0.29M, or 0.295M, or 0.3M, or 0.305M, or 0.31M, or 0.315M, or 0.32M, or 0.325M, or 0.33M, or 0.335M, or 0.34M, or 0.345M, or 0.35M, or 0.355M, or 0.36M, or 0.365M, or 0.37M, or 0.375M, or 0.38M, or 0.385M, or 0.39M, or 0.395M, or 0.4M, or 0.405M, or 0.41M, or 0.415M, or 0.42M, or 0.425M, or 0.43M, or 0.435M, or 0.44M, or 0.445M, or 0.45M, or 0.455M, or 0.46M, or 0.465M, or 0.47M, or 0.475M, or 0.48M, or 0.485M, or 0.49M, or 0.495M, or 0.5M, or 0.505M, or 0.51M, or 0.515M, or 0.52M, or 0.525M, or 0.53M, or 0.535M, or 0.54M, or 0.545M, or 0.55M, or 0.555M, or 0.56M, or 0.565M, or 0.57M, or 0.575M, or 0.58M, or 0.585M, or 0.59M, or 0.595M, or 0.6M, or 0.605M, or 0.61M, or 0.615M, or 0.62M, or 0.625M, or 0.63M, or 0.635M, or 0.64M, or 0.645M, or 0.65M, or 0.655M, or 0.66M, or 0.665M, or 0.67M, or 0.675M, or 0.68M, or 0.685M, or 0.69M, or 0.695M, or 0.7M, or 0.705M, or 0.71M, or 0.715M, or 0.72M, or 0.725M, or 0.73M, or 0.735M, or 0.74M, or 0.745M, or 0.75M, or 0.755M, or 0.76M, or 0.765M, or 0.77M, or 0.775M, or 0.78M, or 0.785M, or 0.79M, or 0.795M, or 0.8M, or 0.805M, or 0.81M, or 0.815M, or 0.82M, or 0.825M, or 0.83M, or 0.835M, or 0.84M, or 0.845M, or 0.85M, or 0.855M, or 0.86M, or 0.865M, or 0.87M, or 0.875M, or 0.88M, or 0.885M, or 0.89M, or 0.895M, or 0.9M, or 0.905M, or 0.91M, or 0.915M, or 0.92M, or 0.925M, or 0.93M, or 0.935M, or 0.94M, or 0.945M, or 0.95M, or 0.955M, or 0.96M, or 0.965M, or 0.97M, or 0.975M, or 0.98M, or 0.985M, or 0.99M, or 0.995M, or 1.0M, or 1.005M, or 1.01M, or 1.015M, or 1.02M, or 1.025M, or 1.03M, or 1.035M, or 1.04M, or 1.045M, or 1.05M, or 1.055M, or 1.06M, or 1.065M, or 1.07M, or 1.075M, or 1.08M, or 1.085M, or 1.09M, or 1.095M, or 1.1M, or 1.105M, or 1.11M, or 1.115M, or 1.12M, or 1.125M, or 1.13M, or 1.135M, or 1.14M, or 1.145M, or 1.15M, or 1.155M, or 1.16M, or 1.165M, or 1.17M, or 1.175M, or 1.18M, or 1.185M, or 1.19M, or 1.195M, or 1.2M, or 1.205M, or 1.21M, or 1.215M, or 1.22M, or 1.225M, or 1.23M, or 1.235M, or 1.24M, or 1.245M, or 1.25M, or 1.255M, or 1.26M, or 1.265M, or 1.27M, or 1.275M, or 1.28M, or 1.285M, or 1.29M, or 1.295M, or 1.3M, or 1.305M, or 1.31M, or 1.315M, or 1.32M, or 1.325M, or 1.33M, or 1.335M, or 1.34M, or 1.345M, or 1.35M, or 1.355M, or 1.36M, or 1.365M, or 1.37M, or 1.375M, or 1.38M, or 1.385M, or 1.39M, or 1.395M, or 1.4M, or 1.405M, or 1.41M, or 1.415M, or 1.42M, or 1.425M, or 1.43M, or 1.435M, or 1.44M, or 1.445M, or 1.45M, or 1.455M, or 1.46M, or 1.465M, or 1.47M, or 1.475M, or 1.48M, or 1.485M, or 1.49M, or 1.495M, or 1.5M, or 1.55M, or 1.6M, or 1.65M, or 1.7M, or 1.75M, or 1.8M, or 1.85M, or 1.9M, or 1.95M, or 2.0M, or 2.05M, or 2.1M, or 2.15M, or 2.2M, or 2.25M, or 2.3M, or 2.35M, or 2.4M, or 2.45M, or 2.5M, or 2.55M, or 2.6M, or 2.65M, or 2.7M, or 2.75M, or 2.8M, or 2.85M, or 2.9M, or 2.95M, or 3.0M, or 3.05M, or 3.1M, or 3.15M, or 3.2M, or 3.25M, or 3.3M, or 3.35M, or 3.4M, or 3.45M, or 3.5M, or 3.55M, or 3.6M, or 3.65M, or 3.7M, or 3.75M, or 3.8M, or 3.85M, or 3.9M, or 3.95M, or 4.0M, or 4.05M, or 4.1M, or 4.15M, or 4.2M, or 4.25M, or 4.3M, or 4.35M, or 4.4M, or 4.45M, or 4.5M, or 4.55M, or 4.6M, or 4.65M, or 4.7M, or 4.75M, or 4.8M, or 4.85M, or 4.9M, or 4.95M, or 5.0M, or 5.05M, or 5.1M, or 5.15M, or 5.2M, or 5.25M, or 5.3M, or 5.35M, or 5.4M, or 5.45M, or 5.5M, or 5.55M, or 5.6M, or 5.65M, or 5.7M, or 5.75M, or 5.8M, or 5.85M, or 5.9M, or 5.95M, or 6.0M, or 6.05M, or 6.1M, or 6.15M, or 6.2M, or 6.25M, or 6.3M, or 6.35M, or 6.4M, or 6.45M, or 6.5M, or 6.55M, or 6.6M, or 6.65M, or 6.7M, or 6.75M, or 6.8M, or 6.85M, or 6.9M, or 6.95M, or 7.0M, or 7.05M, or 7.1M, or 7.15M, or 7.2M, or 7.25M, or 7.3M, or 7.35M, or 7.4M, or 7.45M, or 7.5M, or 7.55M, or 7.6M, or 7.65M, or 7.7M, or 7.75M, or 7.8M, or 7.85M, or 7.9M, or 7.95M, or 8.0M, or 8.05M, or 8.1M, or 8.15M, or 8.2M, or 8.25M, or 8.3M, or 8.35M, or 8.4M, or 8.45M, or 8.5M, or 8.55M, or 8.6M, or 8.65M, or 8.7M, or 8.75M, or 8.8M, or 8.85M, or 8.9M, or 8.95M, or 9.0M, or 9.05M, or 9.1M, or 9.15M, or 9.2M, or 9.25M, or 9.3M, or 9.35M, or 9.4M, or 9.45M, or 9.5M, or 9.55M, or 9.6M, or 9.65M, or 9.7M, or 9.75M, or 9.8M, or 9.85M, or 9.9M, or 9.95M, or 10.0M, or 10.05M, or 10.1M, or 10.15M, or 10.2M, or 10.25M, or 10.3M, or 10.35M, or 10.4M, or 10.45M, or 10.5M, or 10.55M, or 10.6M, or 10.65M, or 10.7M, or 10.75M, or 10.8M, or 10.85M, or 10.9M, or 10.95M, or 11.0M, or 11.05M, or 11.1M, or 11.15M, or 11.2M, or 11.25M, or 11.3M, or 11.35M, or 11.4M, or 11.45M, or 11.5M, or 11.55M, or 11.6M, or 11.65M, or 11.7M, or 11.75M, or 11.8M, or 11.85M, or 11.9M, or 11.95M, or 12.0M, or 12.05M, or 12.1M, or 12.15M, or 12.2M, or 12.25M, or 12.3M, or 12.35M, or 12.4M, or 12.45M, or 12.5M, or 12.55M, or 12.6M, or 12.65M, or 12.7M, or 12.75M, or 12.8M, or 12.85M, or 12.9M, or 12.95M, or 13.0M, or 13.05M, or 13.1M, or 13.15M, or 13.2M, or 13.25M, or 13.3M, or 13.35M, or 13.4M, or 13.45M, or 13.5M, or 13.55M, or 13.6M, or 13.65M, or 13.7M, or 13.75M, or 13.8M, or 13.85M, or 13.9M, or 13.95M, or 14.0M, or 14.05M, or 14.1M, or 14.15M, or 14.2M, or 14.25M, or 14.3M, or 14.35M, or 14.4M, or 14.45M, or 14.5M, or 14.55M, or 14.6M, or 14.65M, or 14.7M, or 14.75M, or 14.8M, or 14.85M, or 14.9M, or 14.95M, or 15.0M, 15.5M, or 16.0M, or 16.5M, or 17.0M, or 17.5M, or 18.0M, or 18.5M, or 19.0M, or 19.5M, or 20.0M, or 20.5M, or 21.0M, or 21.5M, or 22.0M, or 22.5M, or 23.0M, or 23.5M, or 24.0M, or 24.5M, or 25.0M, or 25.5M, or 26.0M, or 26.5M, or 27.0M, or 27.5M, or 28.0M, or 28.5M, or 29.0M, or 29.5M, or 30.0M, or 30.5M, or 31.0M, or 31.5M, or 32.0M, or 32.5M, or 33.0M, or 33.5M, or 34.0M, or 34.5M, or 35.0M, or 35.5M, or 36.0M, or 36.5M, or 37.0M, or 37.5M, or 38.0M, or 38.5M, or 39.0M, or 39.5M, or 40.0M, or 40.5M, or 41.0M, or 41.5M, or 42.0M, or 42.5M, or 43.0M, or 43.5M, or 44.0M, or 44.5M, or 45.0M, or 45.5M, or 46.0M, or 46.5M, or 47.0M, or 47.5M, or 48.0M, or 48.5M, or 49.0M, or 49.5M, or 50.0M, or 50.5M, or 51.0M, or 51.5M, or 52.0M, or 52.5M, or 53.0M, or 53.5M, or 54.0M, or 54.5M, or 55.0M, or 55.5M, or 56.0M, or 56.5M, or 57.0M, or 57.5M, or 58.0M, or 58.5M, or 59.0M, or 59.5M, or 60.0M, or 60.5M, or 61.0M, or 61.5M, or 62.0M, or 62.5M, or 63.0M, or 63.5M, or 64.0M, or 64.5M, or 65.0M, or 65.5M, or 66.0M, or 66.5M, or 67.0M, or 67.5M, or 68.0M, or 68.5M, or 69.0M, or 69.5M, or 70.0M, or 70.5M, or 71.0M, or 71.5M, or 72.0M, or 72.5M, or 73.0M, or 73.5M, or 74.0M, or 74.5M, or 75.0M, or 75.5M, or 76.0M, or 76.5M, or 77.0M, or 77.5M, or 78.0M, or 78.5M, or 79.0M, or 79.5M, or 80.0M

SOME EXAMPLE EMBODIMENTS

1. A process comprising:

reacting a component comprising an alkaline-earth cation—weak acid anion with a component comprising a small molecular weight acid to form a component comprising an alkaline-earth cation—small molecular weight acid anion and a component comprising a weak acid derivative;

reacting the component comprising an alkaline-earth cation—small molecular weight acid anion with a component comprising an alkali sulfate to form a component comprising an alkali cation—small molecular weight acid anion and a component comprising an alkaline-earth sulfate;

reacting the component comprising an alkali cation—small molecular weight acid anion with a component comprising a large molecular weight acid anion;

forming a component comprising an alkali cation—large molecular weight acid anion;

reacting a component comprising an alkali cation—large molecular weight acid anion with a component comprising an alkaline earth oxide, or alkaline earth hydroxide, or alkaline earth carbonate, or alkaline earth bicarbonate, or any combination thereof to form a component comprising an alkali hydroxide, or alkali carbonate, or alkali bicarbonate, or any combination thereof.

2. The process of example embodiment 1 wherein the alkali in the alkali sulfate comprises lithium (Li), or sodium (Na), or potassium (K), or rubidium (Rb), or cesium (Cs), or ammonia (NH3), ammonium (NH4), or an amine.

3. The process of example embodiment 1 wherein the large molecular weight acid, or small molecular weight acid, or any combination thereof comprises a carboxylic acid.

4. The process of example embodiment 1 wherein the weak acid derivative comprises one or more or any combination of the following: carbon dioxide, or hydrogen sulfide, or an aluminum oxide, or an iron oxide, or a silicon oxide.

5. The process of example embodiment 1 wherein the alkaline-earth cation-weak acid anion comprises calcium carbonate, or calcium oxide, or calcium hydroxide, or calcium silicate, or any combination thereof.

6. The process of example embodiment 1 wherein the small molecular weight acid comprises one or more or any combination of the following: formic acid, or acetic acid, or propanoic acid, or an acid with a molecular weight less than 125 grams per mole, or an acid with a molecular weight less than 100 grams per mole, or an acid with a molecular weight less than 90 grams per mole, or an acid with a molecular weight less than 80 grams per mole, or an acid with a molecular weight less than the molecular weight of the large molecular weight acid.

7. The process of example embodiment 1 wherein the large molecular weight acid comprising one or more or any combination of the following: citric acid, or ascorbic acid, or malic acid, or lactic acid, or a carboxylic acid, or an acid with a molecular weight greater than 90 grams per mole, or an acid with a molecular weight greater than 100 grams per mole, or an acid with a molecular weight greater than 110 grams per mole, or an acid with a molecular weight greater than 120 grams per mole, or an acid with a molecular weight greater than the molecular weight of the small molecular weight acid.

8. The process of example embodiment 1 wherein said forming comprises separating at least a portion of a chemical comprising the small molecular weight acid from a component comprising alkali cation+large molecular weight acid species using a semipermeable membrane.

9. The process of example embodiment 8 wherein the semipermeable membrane forms a permeate comprising small molecular weight acid and a retentate comprising alkali cation+large molecular weight acid anion.

10. The process of example embodiment 8 wherein said semi-permeable membrane comprises one or more or any combination of the following: reverse osmosis, or nanofiltration, or forward osmosis, or osmotically assisted reverse osmosis, or electrodialysis.

11. The process of example embodiment 1 wherein said forming comprises separating at least a portion of the component comprising the small molecular weight acid from a component comprising alkali cation+large molecular weight acid species using distillation.

12. The process of example embodiment 12 wherein said distillation comprises separating a portion of the component comprising the small molecular weight acid from a portion of the component comprising alkali cation+large molecular weight acid species due to the greater vapor pressure of the component comprising the small molecular weight acid.

13. The process of example embodiment 1 wherein said reacting a component comprising an alkali cation—large molecular weight acid anion with a component comprising an alkaline earth oxide, or alkaline earth hydroxide, or alkaline earth carbonate, or alkaline earth bicarbonate, or any combination thereof forms a component comprising an alkaline earth cation+large molecular weight acid anion.

14. The process of example embodiment 14 wherein the component comprising alkaline earth cation+large molecular weight acid anion is reacted with a component comprising sulfur dioxide, or sulfurous acid, or aqueous sulfur dioxide, or sulfite, or bisulfite, or other sulfur dioxide species to form a component comprising an alkaline earth sulfite and a component comprising a large molecular weight acid.

15. The process of example embodiment 15 wherein the component comprising an alkaline earth sulfite is thermally decomposed to form a component comprising an alkaline earth oxide and a component comprising sulfur dioxide.

16. The process of example embodiment 16 wherein the component comprising an alkaline earth oxide is reacted with water to form a component comprising an alkaline earth hydroxide.

17. The process of example embodiment 1 wherein the alkaline earth is selected from one or more or any combination of the following: beryllium (Be), magnesium (Mg), calcium (Ca), strontium (Sr), barium (Ba), and radium (Ra), or amine.

18. The process of example embodiment 17 wherein a portion of the reaction comprises facilitate the dehydration of a portion of alkaline earth sulfite.

19. A process comprising:

reacting the component comprising an alkaline-earth cation—small molecular weight acid anion with a component comprising an alkali sulfate to form a component comprising an alkali cation—small molecular weight acid anion and a component comprising an alkaline-earth sulfate;

reacting the component comprising an alkali cation—small molecular weight acid anion with a component comprising a large molecular weight acid anion;

forming a component comprising an alkali cation—large molecular weight acid anion;

reacting a component comprising an alkali cation—large molecular weight acid anion with a component comprising an alkaline earth oxide, or alkaline earth hydroxide, or alkaline earth carbonate, or alkaline earth bicarbonate, or any combination thereof to form a component comprising an alkali hydroxide, or alkali carbonate, or alkali bicarbonate, or any combination thereof.

The invention claimed is:

1. A process comprising:

reacting a component comprising an alkaline-earth cation—weak acid anion with a component comprising a small molecular weight acid to form a component comprising an alkaline-earth cation—small molecular weight acid anion and a component comprising a weak acid derivative;

reacting the component comprising an alkaline-earth cation—small molecular weight acid anion with a component comprising an alkali sulfate to form a component comprising an alkali cation—small molecular weight acid anion and a component comprising an alkaline-earth sulfate;

reacting the component comprising an alkali cation—small molecular weight acid anion with a component comprising a large molecular weight acid anion;

forming a component comprising an alkali cation—large molecular weight acid anion; and reacting at least a portion of the formed component comprising the alkali cation—large molecular weight acid anion with a component comprising an alkaline earth oxide, or an alkaline earth hydroxide, or an alkaline earth carbonate, or an alkaline earth bicarbonate, or any combination thereof to form a component comprising an alkali hydroxide, or an alkali carbonate, or an alkali bicarbonate, or any combination thereof;

wherein the small molecular weight acid comprises an acid anion which has a molecular weight which is less than the large molecular weight acid anion in the component comprising the large molecular weight acid anion.

2. The process of claim 1 wherein the alkali in the alkali sulfate comprises lithium (Li), or sodium (Na), or potassium (K), or rubidium (Rb), or cesium (Cs), or ammonia ($NH_3$), or ammonium ($NH_4$), or an amine.

3. The process of claim 1 wherein the large molecular weight acid, or small molecular weight acid, or any combination thereof comprises a carboxylic acid.

4. The process of claim 1 wherein the weak acid derivative comprises one or more or any combination of the following: carbon dioxide, or hydrogen sulfide, or an aluminum oxide, or an iron oxide, or a silicon oxide.

5. The process of claim 1 wherein the alkaline-earth cation—weak acid anion comprises calcium carbonate, or calcium oxide, or calcium hydroxide, or calcium silicate, or any combination thereof.

6. The process of claim 1 wherein the small molecular weight acid comprises one or more or any combination of the following: formic acid, or acetic acid, or propanoic acid, or an acid with a molecular weight of less than about 125 grams per mole.

7. The process of claim 1 wherein the large molecular weight acid comprises one or more or any combination of the following: citric acid, or ascorbic acid, or malic acid, or lactic acid, or a carboxylic acid, or an acid with a molecular weight of greater than about 90 grams per mole.

8. The process of claim 1 wherein said forming the component comprising the alkali cation—large molecular weight acid anion comprises using a semipermeable membrane to separate at least a portion of one or more components comprising an alkali cation and a large molecular weight acid species.

9. The process of claim 8 wherein using the semipermeable membrane forms a permeate comprising a small molecular weight acid and a retentate comprising the component comprising the alkali cation and the large molecular weight acid anion.

10. The process of claim 8 wherein said semi-permeable membrane comprises one or more or any combination of the following: a reverse osmosis membrane, or a nanofiltration membrane, or a forward osmosis membrane, or an osmotically assisted reverse osmosis membrane, or an electrodialysis membrane.

11. The process of claim 1 wherein said forming the component comprising the alkali cation—large molecular weight acid anion comprises using distillation to separate at least a portion of one or more components comprising an alkali cation and a large molecular weight acid species.

12. The process of claim 11 wherein using distillation comprises separating at least a portion of a small molecular weight acid from at least a portion of the one or more components comprising the alkali cation and the large molecular weight acid species.

13. The process of claim 1 wherein said reacting the component comprising the alkali cation—large molecular weight acid anion with the component comprising the alkaline earth oxide, or the alkaline earth hydroxide, or the alkaline earth carbonate, or the alkaline earth bicarbonate, or any combination thereof is conducted under conditions to form a component comprising an alkaline earth cation and a large molecular weight acid anion.

14. The process of claim 13 which further comprises reacting the component comprising the alkaline earth cation and the large molecular weight acid anion with a component comprising sulfur dioxide, or sulfurous acid, or aqueous sulfur dioxide, or a sulfite, or a bisulfite, or another sulfur dioxide species under conditions to form a component comprising an alkaline earth sulfite and a component comprising a large molecular weight acid.

15. The process of claim 14 which further comprises thermally decomposing the component comprising the alkaline earth sulfite under conditions to form a component comprising an alkaline earth oxide and a component comprising sulfur dioxide.

16. The process of claim 15 which further comprises reacting the component comprising the alkaline earth oxide with water under conditions to form a component comprising an alkaline earth hydroxide.

17. The process of claim 1 wherein the alkaline earth cation is selected from one or more or any combination of the following: beryllium (Be), magnesium (Mg), calcium (Ca), strontium (Sr), barium (Ba), and radium (Ra), or an amine.

18. The process of claim 16 which further comprises dehydrating at least a portion of any alkaline earth sulfite present.

19. The process of claim 1 wherein the small molecular weight acid comprises an acid with a greater vapor pressure than a large molecular weight acid from which the large molecular weight acid anion is derived.

20. A process comprising:

reacting a component comprising an alkaline-earth cation—small molecular weight acid anion with a component comprising an alkali sulfate to form a component comprising an alkali cation—small molecular weight acid anion and a component comprising an alkaline-earth sulfate;

reacting the component comprising an alkali cation—small molecular weight acid anion with a component comprising a large molecular weight acid anion;

forming a component comprising an alkali cation—large molecular weight acid anion; and reacting at least a portion of the component comprising the alkali cation—large molecular weight acid anion with a component comprising an alkaline earth oxide, or an alkaline earth hydroxide, or an alkaline earth carbonate, or an alkaline earth bicarbonate, or any combination thereof to form a component comprising an alkali hydroxide, or an alkali carbonate, or an alkali bicarbonate, or any combination thereof;

wherein the small molecular weight acid anion in the component comprising the alkaline-earth cation—small molecular weight acid anion has a molecular weight which is less than the large molecular weight acid anion in the component comprising the large molecular weight acid anion.

21. The process of claim 20 wherein the small molecular weight acid anion is derived from an acid with a greater vapor pressure than a large molecular weight acid from which the large molecular weight acid anion is derived.

* * * * *